United States Patent
Hopkins

(10) Patent No.: US 9,171,049 B2
(45) Date of Patent: Oct. 27, 2015

(54) OFFLINE SIMULATION OF ONLINE SESSION BETWEEN CLIENT AND SERVER

(75) Inventor: Christopher D. Hopkins, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 2127 days.

(21) Appl. No.: 10/287,177

(22) Filed: Nov. 4, 2002

(65) Prior Publication Data

US 2003/0233404 A1 Dec. 18, 2003

Related U.S. Application Data

(60) Provisional application No. 60/388,832, filed on Jun. 13, 2002.

(51) Int. Cl.
*G06F 17/00* (2006.01)
*G06F 17/30* (2006.01)
*G06F 3/0484* (2013.01)
(Continued)

(52) U.S. Cl.
CPC ........ *G06F 17/30575* (2013.01); *G06F 3/0484* (2013.01); *G06F 17/303* (2013.01); *G06F 17/30861* (2013.01); *H04L 41/145* (2013.01); *H04L 67/14* (2013.01); *H04L 67/2804* (2013.01); *H04L 67/42* (2013.01); *H04L 12/2602* (2013.01); *H04L 29/06* (2013.01); *H04L 29/0809* (2013.01); *H04L 29/08072* (2013.01); *H04L 41/22* (2013.01); *H04L 63/08* (2013.01); *H04L 63/102* (2013.01)

(58) Field of Classification Search
CPC ... G06F 17/303; H04L 67/2804; H04L 67/14; H04L 29/08072; H04L 29/06; H04L 29/0809; H04L 63/08; H04L 63/102; H04L 41/22; H04L 12/2602

USPC .............. 715/513, 501.1, 201–203, 736, 740, 715/745; 709/203, 213–229; 434/118, 362
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Bray, Tim et al.: "Extensible Markup Language (XML) 1.0" *W3C Recommendation*, http://www.w3.org/TR/2000/REC-xml-2000100; Oct. 6, 2000; printed on Jun. 13, 2002.
(Continued)

*Primary Examiner* — Quoc A Tran
(74) *Attorney, Agent, or Firm* — Haynes Beffel & Wolfeld LLP

(57) ABSTRACT

Systems and Methods for conducting an offline session simulating an online session between a client and server in a network environment. The client imports data and functional logic from the server prior to going offline. The imported functional logic is embedded into a format or document that is capable of being interpreted and performed by the local interface at the client that is used to interact with server when online. Whether offline or online, the user utilizes the same local interface at the client to transmit instructions to the functional logic to manipulate the data. In an offline session, such instructions cause the imported and embedded functional logic to execute, thereby manipulating the data imported at the client. Known synchronization methods may also be used to maintain consistency and coherency between the imported data at the client and the database at the server.

28 Claims, 25 Drawing Sheets

(51) Int. Cl.
  *H04L 29/06* (2006.01)
  *H04L 29/08* (2006.01)
  *H04L 12/26* (2006.01)
  *H04L 12/24* (2006.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,594,682 B2 * | 7/2003 | Peterson et al. | 709/219 |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,954,782 B2 * | 10/2005 | Thurlow et al. | 709/206 |
| 7,062,502 B1 | 6/2006 | Kesler | |
| 7,069,231 B1 | 6/2006 | Cinarkaya et al. | |
| 7,069,497 B1 | 6/2006 | Desai | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,603,483 B2 | 10/2009 | Psounis et al. | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,209,333 B2 | 6/2012 | Hubbard et al. | |
| 8,255,548 B2 | 8/2012 | Hopkins et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,756,275 B2 | 6/2014 | Jakobson | |
| 8,769,004 B2 | 7/2014 | Jakobson | |
| 8,769,017 B2 | 7/2014 | Jakobson | |
| 2001/0044791 A1 | 11/2001 | Richter et al. | |
| 2002/0022986 A1 | 2/2002 | Coker et al. | |
| 2002/0023057 A1 | 2/2002 | Goodwin et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0069282 A1 * | 6/2002 | Reisman | 709/227 |
| 2002/0072951 A1 | 6/2002 | Lee et al. | |
| 2002/0082892 A1 | 6/2002 | Raffel et al. | |
| 2002/0083145 A1 * | 6/2002 | Perinpanathan | 709/213 |
| 2002/0091562 A1 | 7/2002 | Siegel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2002/0194219 A1 * | 12/2002 | Bradley et al. | 707/506 |
| 2002/0198951 A1 * | 12/2002 | Thurlow et al. | 709/206 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0023657 A1 * | 1/2003 | Fischer et al. | 709/102 |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0152901 A1 | 8/2003 | Altenhofen et al. | |
| 2003/0158947 A1 * | 8/2003 | Bloch et al. | 709/227 |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |

(56) References Cited

U.S. PATENT DOCUMENTS

| | | |
|---|---|---|
| 2004/0064570 A1 | 4/2004 | Tock |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0215672 A1 | 10/2004 | Pfitzner |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0164684 A1* | 7/2005 | Chen et al. ............... 455/414.1 |
| 2006/0021019 A1 | 1/2006 | Hinton et al. |
| 2007/0078950 A1 | 4/2007 | Hopkins et al. |
| 2008/0086564 A1 | 4/2008 | Putman et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0100367 A1 | 4/2010 | Hopkins |
| 2010/0325089 A1 | 12/2010 | Hopkins |
| 2010/0325174 A1 | 12/2010 | Hopkins |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0158833 A1 | 6/2012 | Hopkins |
| 2012/0158909 A1 | 6/2012 | Hopkins |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0238692 A1 | 9/2013 | Hopkins |
| 2013/0238693 A1 | 9/2013 | Hopkins |
| 2013/0239007 A1 | 9/2013 | Hopkins |
| 2013/0246351 A1 | 9/2013 | Hopkins |
| 2013/0246483 A1 | 9/2013 | Hopkins |
| 2013/0247216 A1 | 9/2013 | Cinarkaya et al. |
| 2013/0254267 A1 | 9/2013 | Hopkins |

OTHER PUBLICATIONS

Clark, James: "XSL Transformations (XSLT) Version 1.0" *W3C Recommendation*, http://www.w3.org/TR/1999/REC-xslt-19991116; Nov. 16, 1999; printed on Jun. 13, 2002.
Winer, Dave: "XML-RPC Specification" at XML-RPC.com: posted Jun. 15, 1999; printed on Jun. 13, 2002.
U.S. Appl. No. 12/581,733—Non-Final Office Action dated Nov. 28, 2011, 21 pgs.
U.S. Appl. No. 12/581,733—Response filed Feb. 28, 2012, 12 pgs.
U.S. Appl. No. 12/581,733—Substitute Response filed Mar. 7, 2012, 12 pgs.
U.S. Appl. No. 12/581,733—Final Office Action dated Apr. 27, 2012, 17 pgs.
U.S. Appl. No. 12/581,733—Response filed Jul. 27, 2012, 15 pgs.
U.S. Appl. No. 12/581,733—Non-Final Office Action dated May 24, 2013, 13 pgs.
U.S. Appl. No. 12/581,733—Response filed Aug. 26, 2013, 17 pgs.
U.S. Appl. No. 12/581,733—Final Office Action dated Dec. 23, 2013, 17 pgs.
U.S. Appl. No. 12/581,733—Response filed Feb. 24, 2014, 22 pgs.
U.S. Appl. No. 12/581,733—Suppelemental Response filed May 1, 2014, 22 pgs.
U.S. Appl. No. 12/581,733—Non-Final Office Action dated Nov. 18, 2014, 13 pgs.
U.S. Appl. No. 12/581,733—Response filed Feb. 18, 2015, 14 pgs.
U.S. Appl. No. 12/581,733—Final Office Action dated Jun. 1, 2014, 12 pgs.
U.S. Appl. No. 12/773,789—Office Action dated Feb. 21, 2012, 17 pgs.
U.S. Appl. No. 12/773,789—Response filed May 18, 2012, 14 pgs.
U.S. Appl. No. 12/773,789—Office Action dated May 5, 2012, 21 pgs.
U.S. Appl. No. 12/773,789—Response filed Jan. 4, 2013, 13 pgs.
U.S. Appl. No. 12/773,789—Non-Final Office Action dated May 10, 2013, 27 pgs.
U.S. Appl. No. 12/773,789—Response filed Aug. 12, 2013, 13 pgs.
U.S. Appl. No. 12/773,789—Office Action dated Dec. 4, 2013, 27 pgs.
U.S. Appl. No. 12/773,789—Response filed Apr. 4, 2014, 14 pgs.
U.S. Appl. No. 12/773,789—Office Action dated Jul. 31, 2014, 41 pgs.
U.S. Appl. No. 12/773,789—Response filed Sep. 26, 2014, 5 pgs.
U.S. Appl. No. 12/773,789—Supplemental Response filed Oct. 29, 2014, 5 pgs.
U.S. Appl. No. 12/773,789—Office Action dated Feb. 27, 2015, 38 pgs.
U.S. Appl. No. 12/773,789—Response filed May 27, 2015, 10 pgs.
U.S. Appl. No. 12/773,787—Non-Final Office Action dated Feb. 17, 2012, 17 pgs.
U.S. Appl. No. 12/773,787—Response filed May 17, 2012, 14 pgs.
U.S. Appl. No. 12/773,787—Final Office Action dated Oct. 2, 2012, 21 pgs.
U.S. Appl. No. 12/773,787—Response filed Jan. 2, 2013, 12 pgs.
U.S. Appl. No. 12/773,787—Non-Final Office Action dated May 14, 2013, 26 pgs.
U.S. Appl. No. 12/773,787—Response filed Aug. 14, 2013, 13 pgs.
U.S. Appl. No. 12/773,787—Non-Final Office Action dated Dec. 5, 2013, 25 pgs.
U.S. Appl. No. 12/773,787—Response filed Apr. 7, 2014, 14 pgs.
U.S. Appl. No. 12/773,787—Final Office Action dated Jul. 31, 2014, 36 pgs.
U.S. Appl. No. 12/773,787—Response filed Sep. 26, 2014, 12 pgs.
U.S. Appl. No. 12/773,787—Supplemental Response filed Oct. 29, 2014, 13 pgs.
U.S. Appl. No. 12/773,787—Non-Final Office Action dated Feb. 27, 2015, 36 pgs.
U.S. Appl. No. 12/773,787—Response filed May 27, 2015, 9 pgs.
U.S. Appl. No. 13/409,009—Non-Final Office Action dated May 8, 2015, 21 pgs.
U.S. Appl. No. 13/409,026—Non-Final Office Action dated May 8, 2015, 18 pgs.
U.S. Appl. No. 11/537,388—Non-Final Office Action dated Apr. 9, 2010, 10 pgs.
U.S. Appl. No. 11/537,388—Response filed Sep. 24, 2010, 12 pgs.
U.S. Appl. No. 11/537,388—Final Office Action dated Dec. 6, 2010, 11 pgs.
U.S. Appl. No. 11/537,388—Response filed Feb. 7, 2011, 12 pgs.
U.S. Appl. No. 11/537,388—Non-Final Office Action dated Mar. 18, 1011, 13 pgs.
U.S. Appl. No. 11/537,388—Response filed Jun. 29, 2011, 11 pgs.
U.S. Appl. No. 11/537,388—Notice of Allowance dated Apr. 27, 2012.

* cited by examiner

FIGURE 11D

OFFLINE SIMULATION OF ONLINE SESSION BETWEEN CLIENT AND SERVER

RELATED APPLICATIONS

This application claims the benefit of U.S. provisional patent application No. 60/388,832 filed on Jun. 13, 2002.

FIELD OF INVENTION

The present invention relates to a computer method and system for simulating an online session while offline, and more particularly, to such a method and system in the field of customer relationship management.

BACKGROUND OF THE INVENTION

The Internet provides the capability to provide services to customers without requiring them to install additional software on their local computers. Specifically, by exploiting the customer's web browser, all functional logic and all data can reside at a remote server rather than at the customer's local computer (i.e., the client). As such, the customer, via instructions submitted through web pages that are displayed in the web browser, can remotely invoke the functional logic to view, create, update, delete or otherwise modify the data residing on the remote server.

In the field of customer relationship management ("CRM"), the foregoing use of the Internet is ideal for enabling sales, customer support, and marketing teams and individuals to organize and manage their customer information. For example, all leads, opportunities, contacts, accounts, forecasts, cases, and solutions can be stored at a secure data center but may be easily viewed by any authorized salesperson (e.g., with a proper username and password) through a web browser and Internet connection. One key benefit of such an online CRM solution is the ability to share data real-time and enable all team members to leverage a common set of information from one accessible location. For example, sales managers can track forecast rollups without requiring each sales representative to submit individual reports, as well as instantly access aggregated sales data without requiring each sales representative to manually submit such data. Similarly, reseller sales representatives and other external partners can be granted secure access to a company's sales data by providing them a username and password for the web site.

Nevertheless, such an online CRM solution suffers from the requirement that a user must have access to an Internet connection in order to access and manipulate the data residing on the remote server. For example, when a sales representative or manager is working in the field, such an Internet connection may not be readily available. As such, what is needed is a method for simulating an online session while the user is offline (e.g., without a network connection). Furthermore, it would be advantageous if such a method minimized the amount of user training and client-side installation and customization by taking advantage of pre-existing interfaces and technologies on the client computer.

SUMMARY OF THE INVENTION

The present invention provides a method and system for simulating an online session between the client and a remote server when the client is offline. The client includes a local interface that can communicate with the remote server. During an online session, the data and the functional logic that is invoked to manipulate the data reside on the remote server. As such, the user transmits instructions to view, create, update, delete, or otherwise modify portions of data through the local interface and subsequently through the underlying network. These instructions are ultimately received at the remote server, which then invokes the proper functional logic to perform the instructions in order to manipulate the data.

In preparation for simulating an online session when the client is offline, when the client is online, it imports at least a subset of the data that resides at the remote server. Furthermore, the client imports at least a subset of the functional logic used to manipulate the data as an embedded portion of a format or document that is capable of being interpreted and performed by the local interface. To initiate an offline session, the user invokes the local interface (as in the online session). However, rather than accessing the remote server, the local interface accesses local documents formatted with the embedded functional logic. As in the online session, the user transmits instructions to view, create, update, delete, or otherwise modify portions of data through the local interface. However, rather than transmitting the instructions through an underlying network, the local interface invokes the embedded functional logic in the documents to manipulate the imported data in response to the instructions. As such, the present invention provides an offline simulation of an online session between the client and a remote server. Because the same local interface that is used in the online session is also used in the offline session, user training for the offline session is minimized or even eliminated. Furthermore, since functional logic is embedded into a format capable of being interpreted and performed by the local interface, the need to install additional standalone software applications is also minimized or eliminated. Further objects and advantages of the present invention will become apparent from a consideration of the drawings and detailed description.

BRIEF DESCRIPTION OF THE DRAWINGS

FIG. 11D is an example of the presentation of "Contacts" CRM data during an offline session (New Contact View).

DETAILED DESCRIPTION OF THE INVENTION

The following detailed description will first describe the structure of an online session that may be simulated by an offline session in accordance with the invention. The structure of the offline session, itself, is then detailed. Following the description of the offline session, preparation of the client prior to conducting such offline sessions (e.g., installation and synchronization phases) is described.

Online Session

Figure 1:
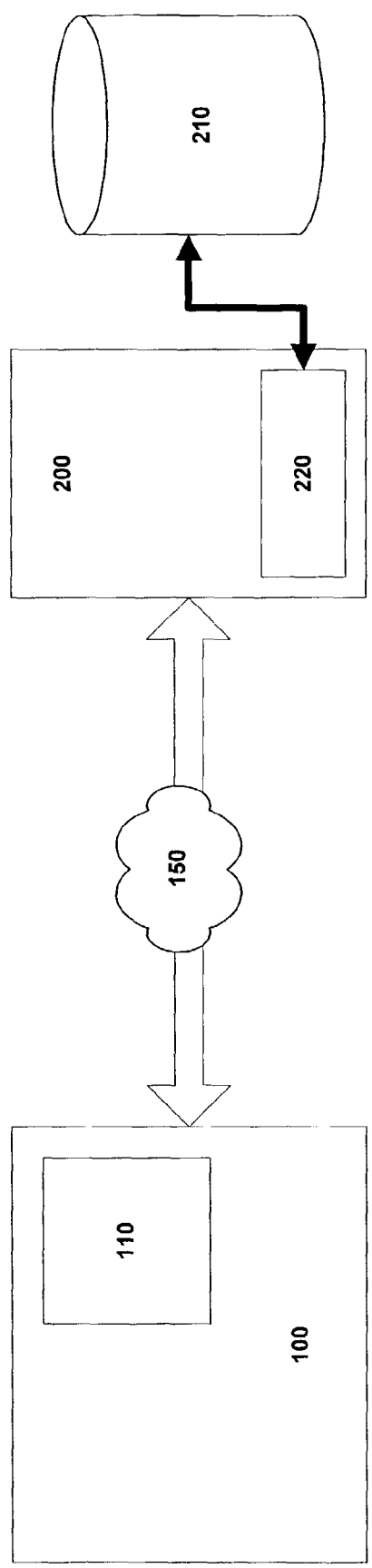
FIG. 1 is a diagram illustrating an online session between a client with a local interface and a remote server with a relational database and functional logic.

Referring to the drawings, FIG. 1 illustrates an online session between a client 100 and a remote server 200. The client includes a local interface 110 while the remote server 200 includes a database 210 and functional logic 220 that is invoked to manipulate the data residing in the database 210. The client 100 establishes communication channels through a network 150 that connects the client 100 to the remote server 200.

In one environment, the network 150 used by the online session may be the Internet. In such an environment, the client 100 may be a laptop or desktop computer and the local interface 110 may be a web browser such as Internet Explorer or Netscape Navigator. The functional logic 220 at the remote server 200 may be invoked through an underlying application or specification such as a CGI program (including, for example, scripts such as Perl), Java servlet (including, for example, JavaServer Pages, or JSP, technology), daemon, service, system agent, server API solution (including, for example, ISAPI or NSAPI) or any other technique or technology known in the art. The database 210 may be a relational database management system such as Oracle or DB2. The communication channels between the local interface 110 and the remote server 200 may be governed by the HTTP protocol. For example, by selecting various options from a web page, a user transmits instructions in the form of an HTTP message through the Internet to the remote server. Upon receiving the HTTP message, the underlying program, component, or application at the remote server performs the pertinent functional logic to interact with and manipulate the data in the database in accordance with the instructions. Those skilled in the art will recognize that the foregoing general online client-server scheme is merely illustrative and that various alternatives, possibly exploiting different technologies, standards and specifications, may also be utilized to create an online session over the Internet in accordance with FIG. 1. Those skilled in the art will also appreciate that functional logic, program, service, agent, API or other computer code and/or data referred to herein or otherwise utilized may be stored, loaded and/or executed from or otherwise embodied in a suitable computer-readable medium, in accordance with the requirements of a particular implementation.

Figure 2:
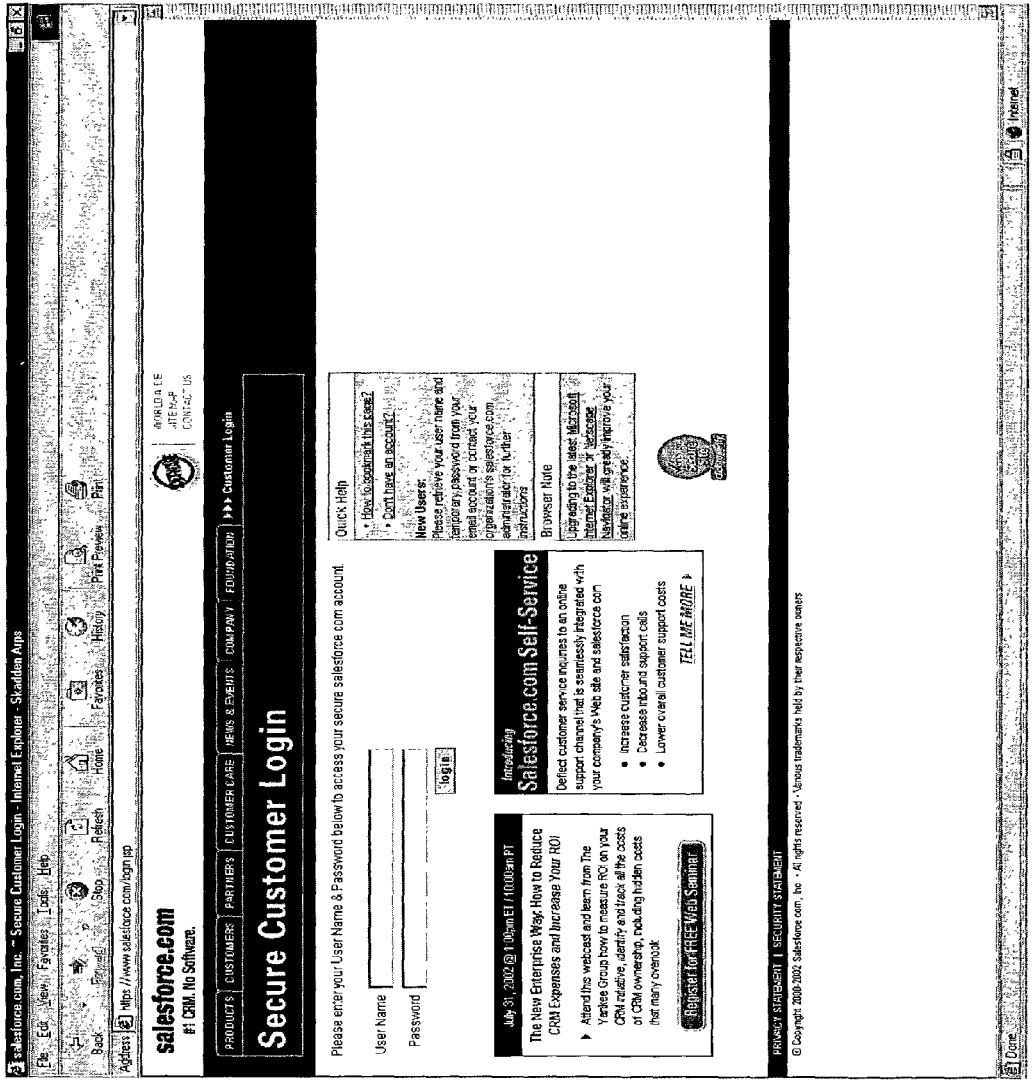
FIG. 2 is an example of a client initiation of an online CRM session with a remote server.
Figure 3:
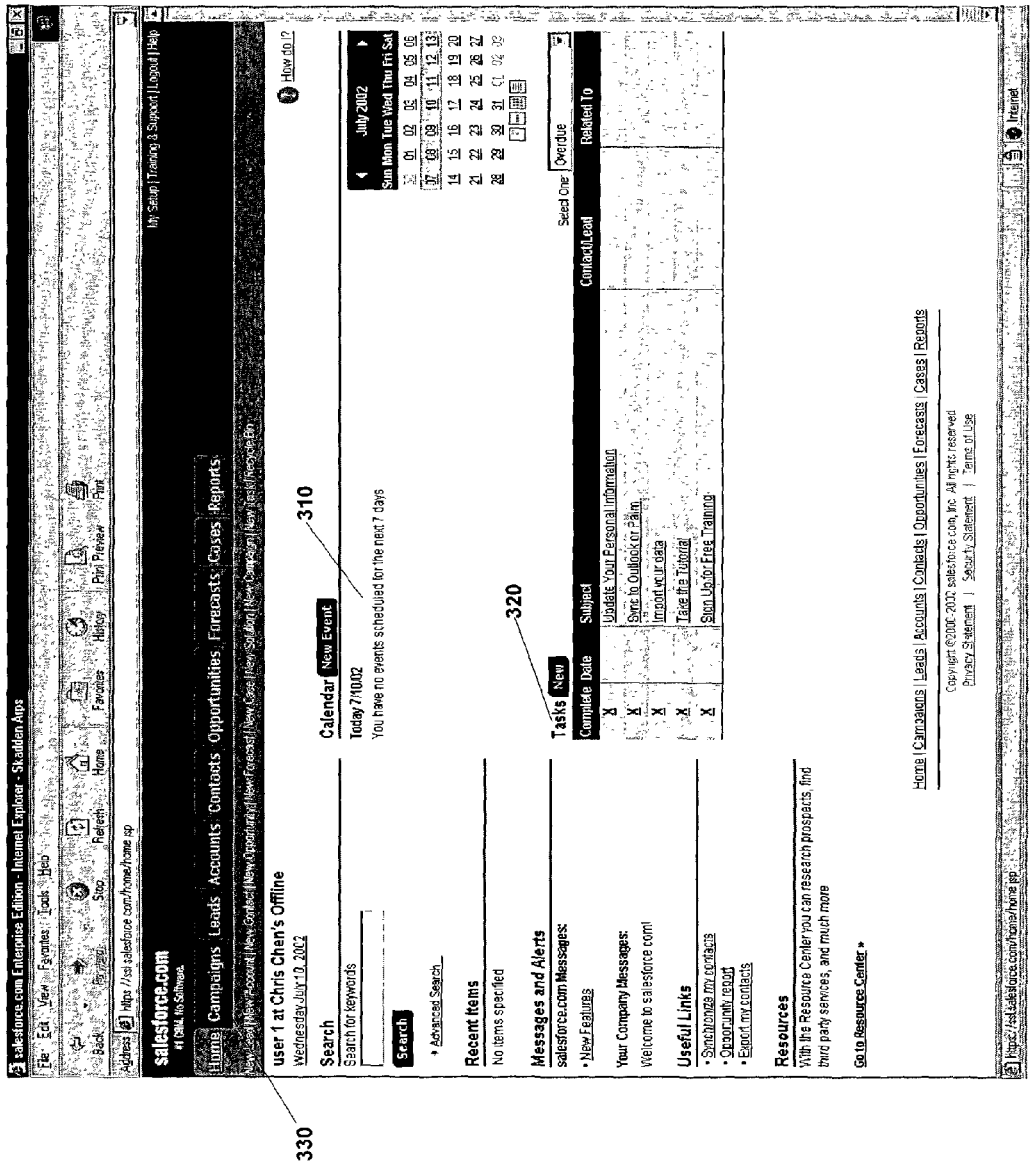
FIG. 3 is an example of the presentation of CRM data on a client's web browser during an online CRM session.

In the field of customer relationship management ("CRM"), such an online client-server scheme can provide the capability to track contacts, leads and customer inquiries without needing a complex software solution on the client-side. For example, in one instance of an online CRM session, the user securely logs into the remote server by entering a username and a password through his local web browser, as shown in FIG. 2. Once the user successfully logs into the remote server, he may be presented with an initial home page that provides access to further features and information. As shown in FIG. 3, for example, the initial home page may provide the user with a brief synopsis of his upcoming events 310 and tasks 320. Furthermore, the initial home page provides access 330 to further pages that enable the user the track, manage and organize other data including campaigns, leads, accounts, contacts, opportunities, forecasts, cases, and reports. Those skilled in the art will recognize that FIGS. 2 and 3 are merely examples of one way of presenting CRM information on a local interface and that there exist innumerous ways (e.g., look and feel) to present CRM information on a local interface in accordance with the online client-server scheme presented herein. Furthermore, those skilled in the art will recognize that the online CRM session described herein is merely an example of one area in which the online client-server scheme may be exploited and that there exist innumerous fields and areas in which this online client-server scheme may be exploited.

Offline Session

Figure 4:
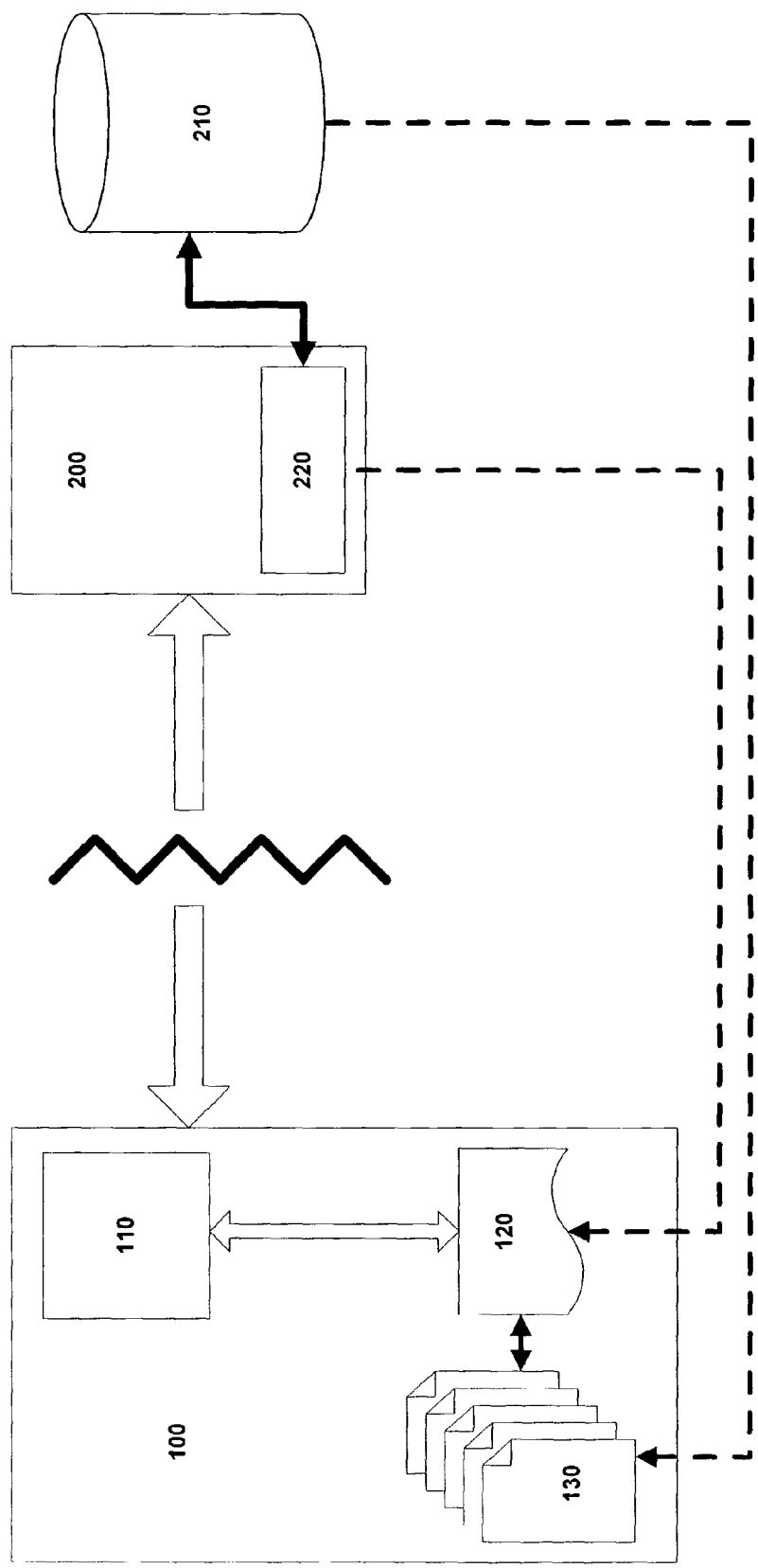
FIG. 4 is a diagram illustrating an offline session.

As shown in FIG. 4, during an offline session, in contrast to an online session as described earlier and illustrated in FIG. 1, the client 100 can no longer establish a communications channel through the network 150 to connect to the remote server 200. As such, at least portions of the data from the database 210 and portions of the functional logic 220 at the remote server 200 are imported to the client 100 so that the client 100 can conduct an offline session in isolation. In FIG. 4, at least a subset 130 of the data 210 is imported to the client 100. Similarly, at least a subset 120 of the functional logic 220 is also imported to the client. This imported functional logic 120 is embedded into a format capable of being interpreted and performed by the local interface.

In an embodiment of an offline session in which the local interface 110 is a web browser, both the data 130 and functional logic 120 may be stored according to an open standards formatting protocol. For example and without limitation, the data 130 may be stored in a single or a series of documents in XML (Extensible Markup Language), possibly including, for example, XSL stylesheets (which are XML documents, themselves) for rendering the data into HTML documents. As is known to those skilled in the art, XML may be considered a markup language (or a specification for creating markup languages) that is used to identify structures within a document. Similarly, the functional logic 120 may be embedded in a document utilizing a markup language and may be expressed as a scripting language within the document. For example and without limitation, the functional logic 120 could be expressed as JavaScript or VBScript that is embedded in an HTML (HyperText Markup Language) document. As used herein, the term "embedded" may mean either actually embedding the JavaScript (or any other functional logic in a format capable of being interpreted and performed by the web browser) code in the HTML document, or alternatively, accessing a separate JavaScript document by, for example, providing the URL (relative or full address) of the JavaScript source code file in the HTML document. As such, when the HTML document is rendered by the web browser, depending upon certain actions taken by the user, certain portions of the functional logic 120 (e.g., JavaScript) may be interpreted and performed by the web browser. Such functional logic 120 may interact with the data 130 expressed as XML. For example and without limitation, a user may request to view portions of the data 130 on the web browser. In response to the request, by calling an XSLT (Extensible Stylesheet Language for Transformations) processor that is incorporated into the web browser (e.g., MSXML Parser) or any other comparable XSLT technology residing at the client, the functional logic 120 may access the appropriate portions of the data 130 (e.g., in XML documents) in conjunction with the appropriate XSL stylesheets, in order to transform or render such data 130 into an HTML document that is visually presented on the web browser.

Preparation of Client for Offline Session

Figure 5:
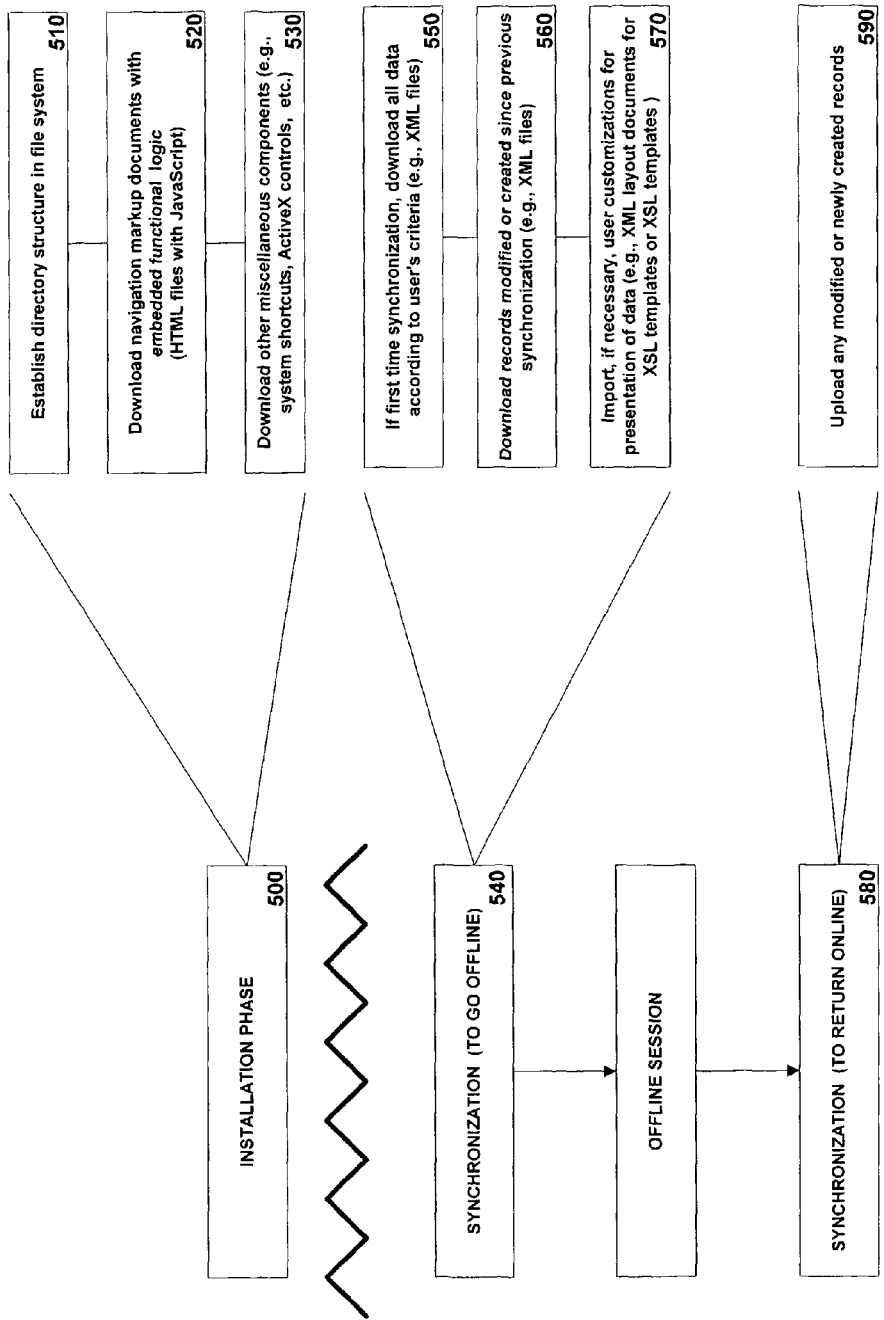
FIG. 5 is a expanded block diagram illustrating one embodiment of the various phases used to provide a client with the capabilities of engaging in an offline CRM session.

Prior to conducting an offline session as described in the foregoing, an initial installation phase and subsequent synchronization sessions may be needed to prepare the client 100 for such an offline session. During the installation phase, an installation or setup executable may be downloaded from the remote server 200 to the client 100. As depicted in FIG. 5, during the installation phase 500, the executable prepares the client for conducting an offline session by, for example and without limitation, (1) establishing a directory structure in the client's file system (Step 510), (2) downloading navigational markup documents with embedded functional logic (e.g., HTML files with embedded JavaScript code or HTML files and related separate JavaScript files) (Step 520); (3) downloading other miscellaneous installation components possibly including static HTML files, stylesheets, XSL templates, ActiveX controls, system shortcuts, local language components and, if not already available, an XML parser that may be integrated into the web browser (e.g., MSXML Parser) (Step 530).

Furthermore, prior to going offline, a user may synchronize the imported subset of data 130 at the client with the data residing in the database 210. For example, if synchronization is occurring for the first time, all data residing in the database 210 that is needed for conducting an offline session may be downloaded from the database 210 to the client 100 (Step 550). This downloaded data may, for example, be defined and customized according to the user's criteria for conducting an offline session. In one implementation, the synchronization process may download this data as XML documents (e.g., according to data type such as accounts, contacts, opportunities, etc.). Once such XML documents are downloaded, XSL templates that are used to visually render the data (e.g., 130 in FIG. 4) on the web browser may be constructed at the client by utilizing the formatting instructions provided by the XML documents. Alternatively, such XSL templates might also be generated at the server and subsequently downloaded to the client. During subsequent synchronization processes prior to going offline 540, as depicted in FIG. 5, modified data records and data records created since the previous synchronization may be downloaded to the client (Step 560). Furthermore, the synchronization process 540 may also provide the opportunity to download (or modify) user customizations (e.g., XML layout information used to construct XSL templates at the client or the XSL templates themselves) for the visual representation of data and other information on the web browser (Step 570). Similarly, upon reestablishing a connection with the remote server 200, the user may also desire to conduct a synchronization process 580 in order to upload any modified or newly created data records to the remote database 210 (Step 590). In one implementation of the synchronization process, the communication channel between the client 100 and the remote server 200 may be established through the HTTP protocol using XML-RPC and a related HTTP/HTTPS server based XML API. Those skilled in the art will recognize that there are alternative synchronization processes other than the one presented in FIG. 5 that may be conducted in accordance with the present invention. For example and without limitation, all synchronization processes, regardless of whether the subsequent activity is an offline session or the re-establishment of an online connection, may simultaneously download modified and newly created data records from the server database to the client as well as upload modified and newly create data records from the client to the server database. Additionally, those skilled in the art will recognize that any variety of techniques and models known in the art may be used implement the synchronization process in order to maintain consistency and coherency while accessing data (e.g., atomic, sequential or causal consistency, etc.).

Figure 6:
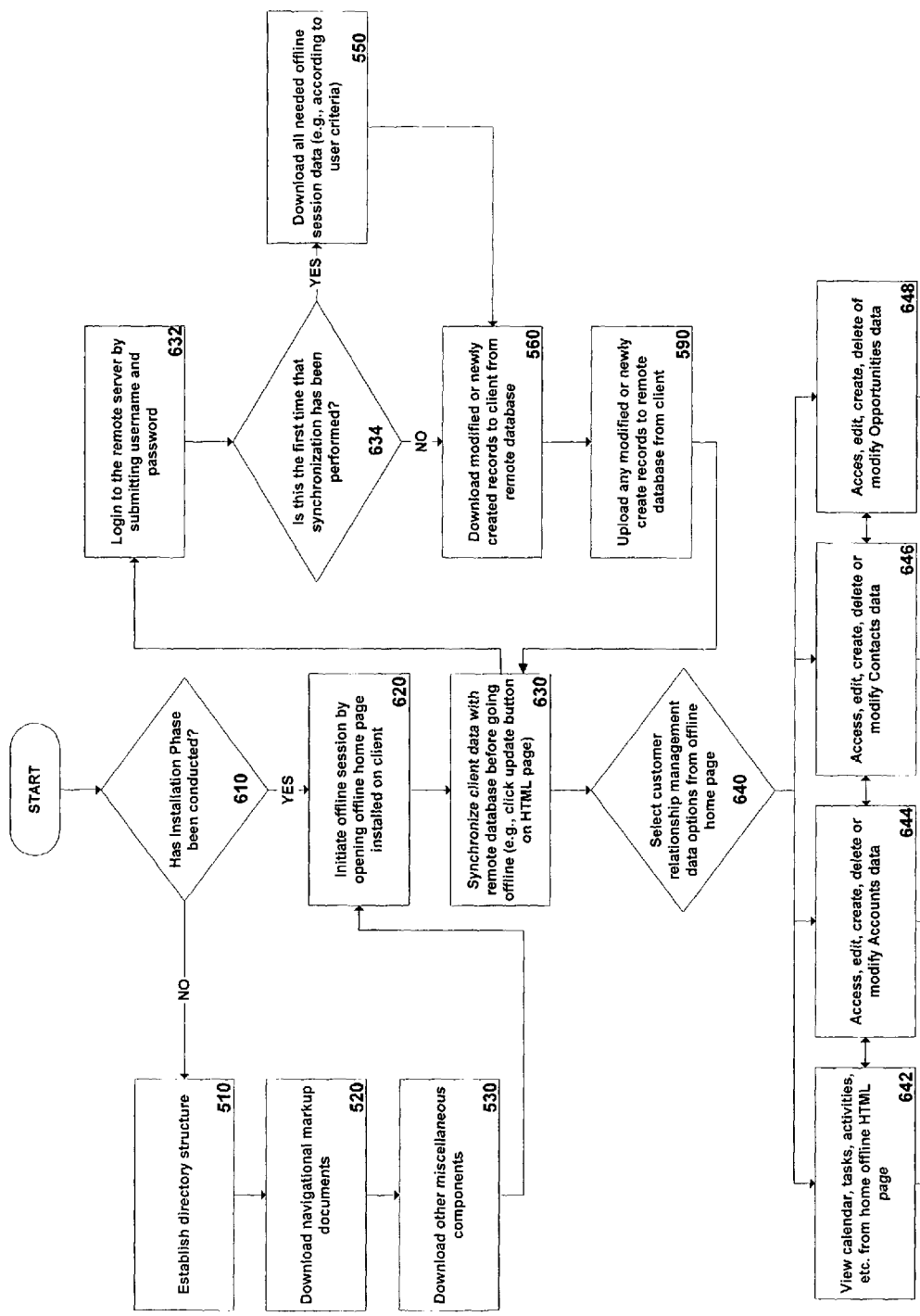
FIG. 6 is a flowchart illustrating one embodiment of a process for conducting an offline CRM session.

FIG. 6 illustrates one embodiment of a process for initiating and conducting an offline CRM session. As depicted, in this embodiment, an initial installation process should be conducted before an offline session can begin (e.g., Steps 610, 510, 520, 530). After installation, a user may initiate an offline session by opening an HTML page downloaded to the client during the installation phase (Step 620). While still online, the user may then synchronize local client data with the remote database before going offline (Step 630 and expanded in Steps 632, 634, 550, 560, 590). As shown in FIG. 6, this may involve downloading data from the remote server (Step 550) as well as uploading data to the remote server (Step 590), and if necessary, an initial download of all offline session data (Step 550). As previously discussed, one implementation of such downloading and uploading may be implemented through HTTP communications channels using XML-RPC. Once synchronization is complete, the user may go offline and manipulate, view, and modify his customer relationship data by selecting from various options through the web browser (Step 640). For example and without limitation, the user may view his calendar, tasks, and activities (Step 642). Additionally, data may be organized into certain categories such as accounts, contacts, and opportunities. The user may be able to maneuver through the web browser to access, edit, create, delete, or otherwise modify data within these categories (Steps 642, 644, 646, 648).

Figure 7:
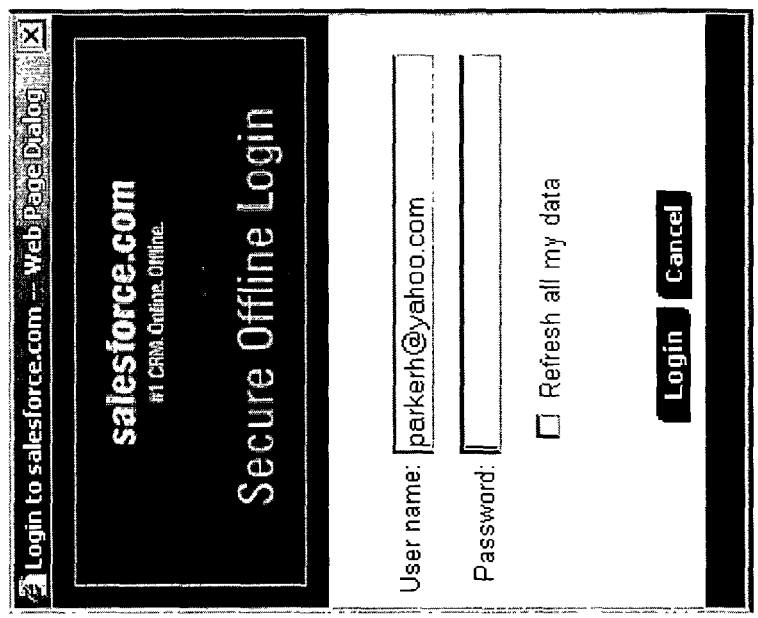
FIG. 7 is an example of a login session to connect to a remote server during a synchronization process.
Figure 8:
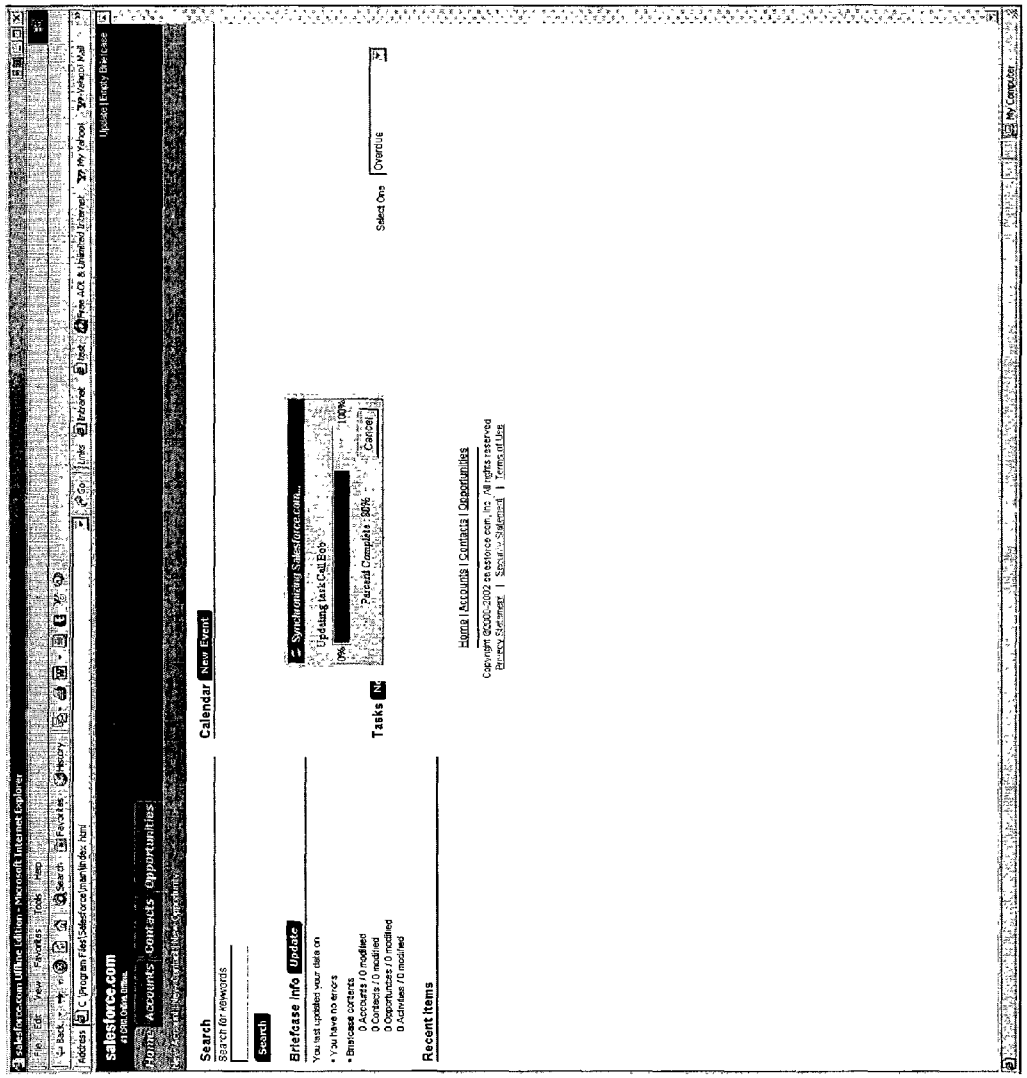
FIG. 8 is an example of a visual representation of a synchronization process with the remote server.
Figure 9A:
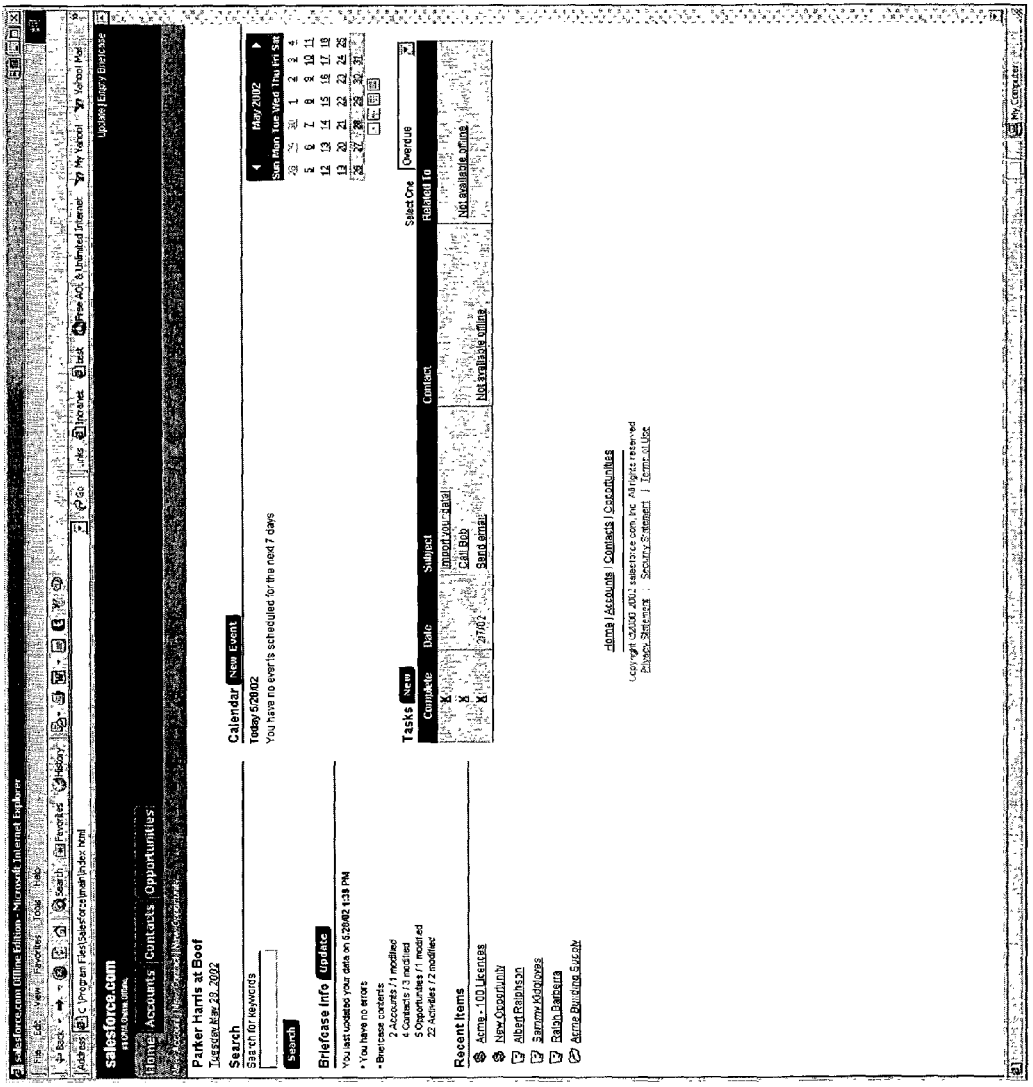
FIG. 9A is a first example of the presentation of CRM data during an offline session (Home View).
Figure 9B:
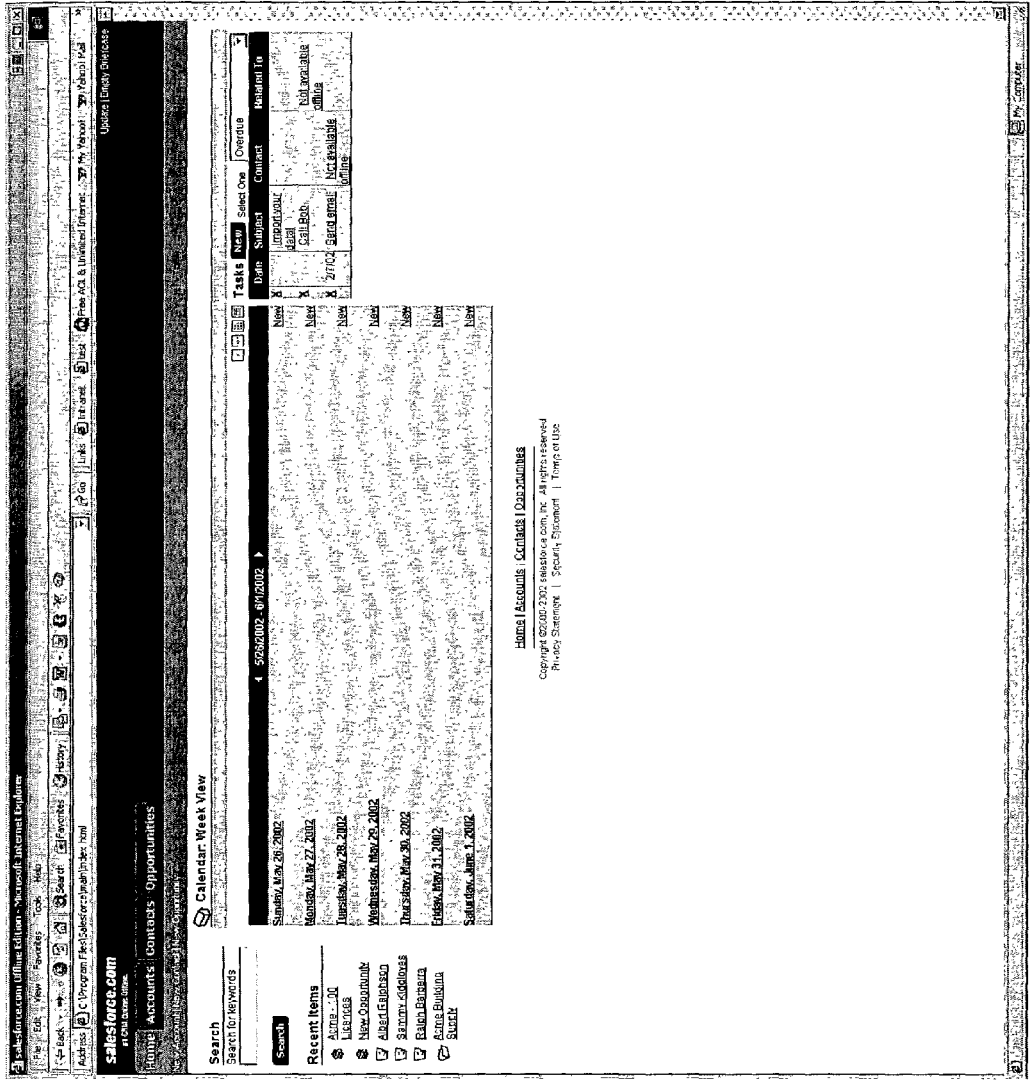
FIG. 9B is a second example of the presentation of CRM data during an offline session (Home View).
Figure 9C:
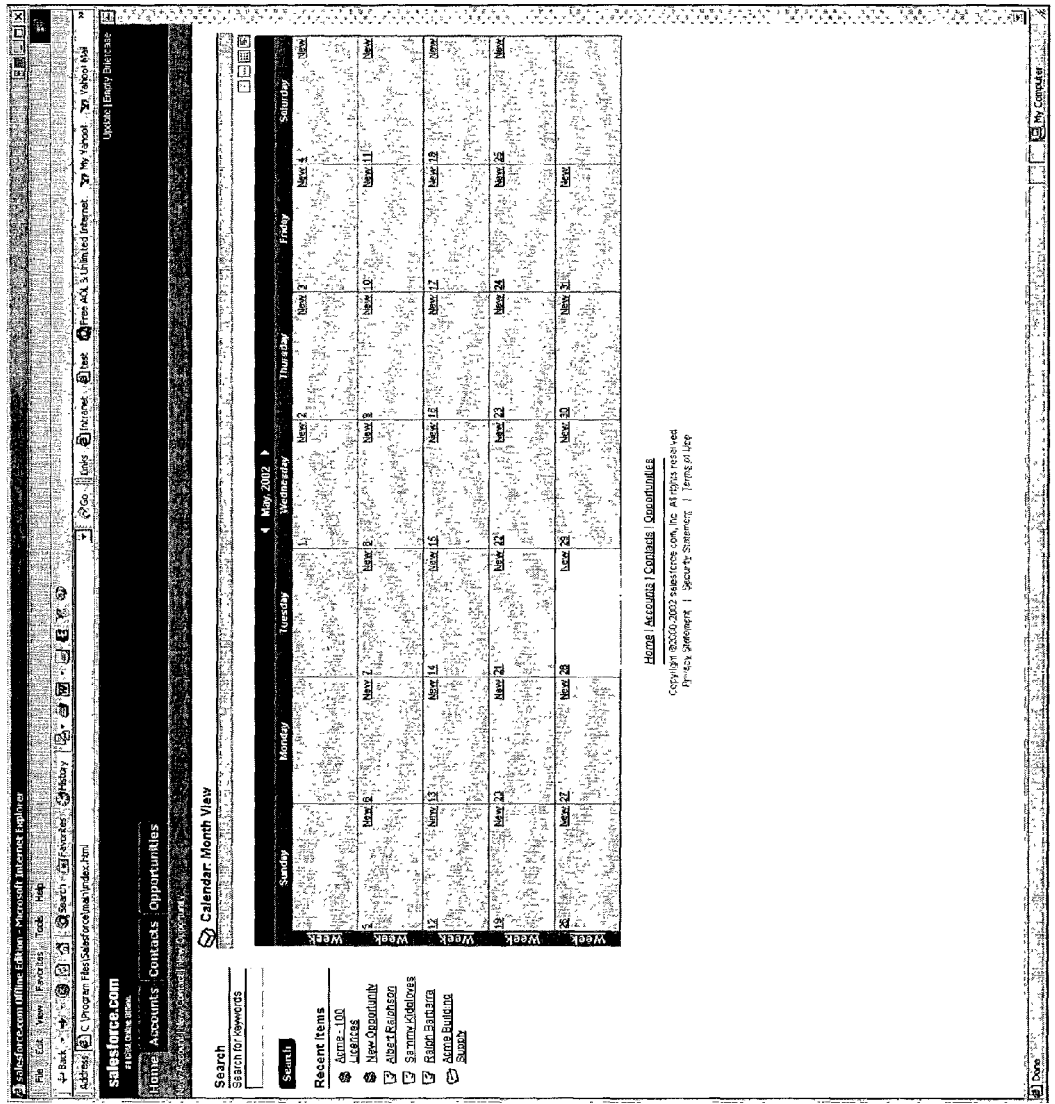
FIG. 9C is a third example of the presentation of CRM data during an offline session (Home View).
Figure 9D:
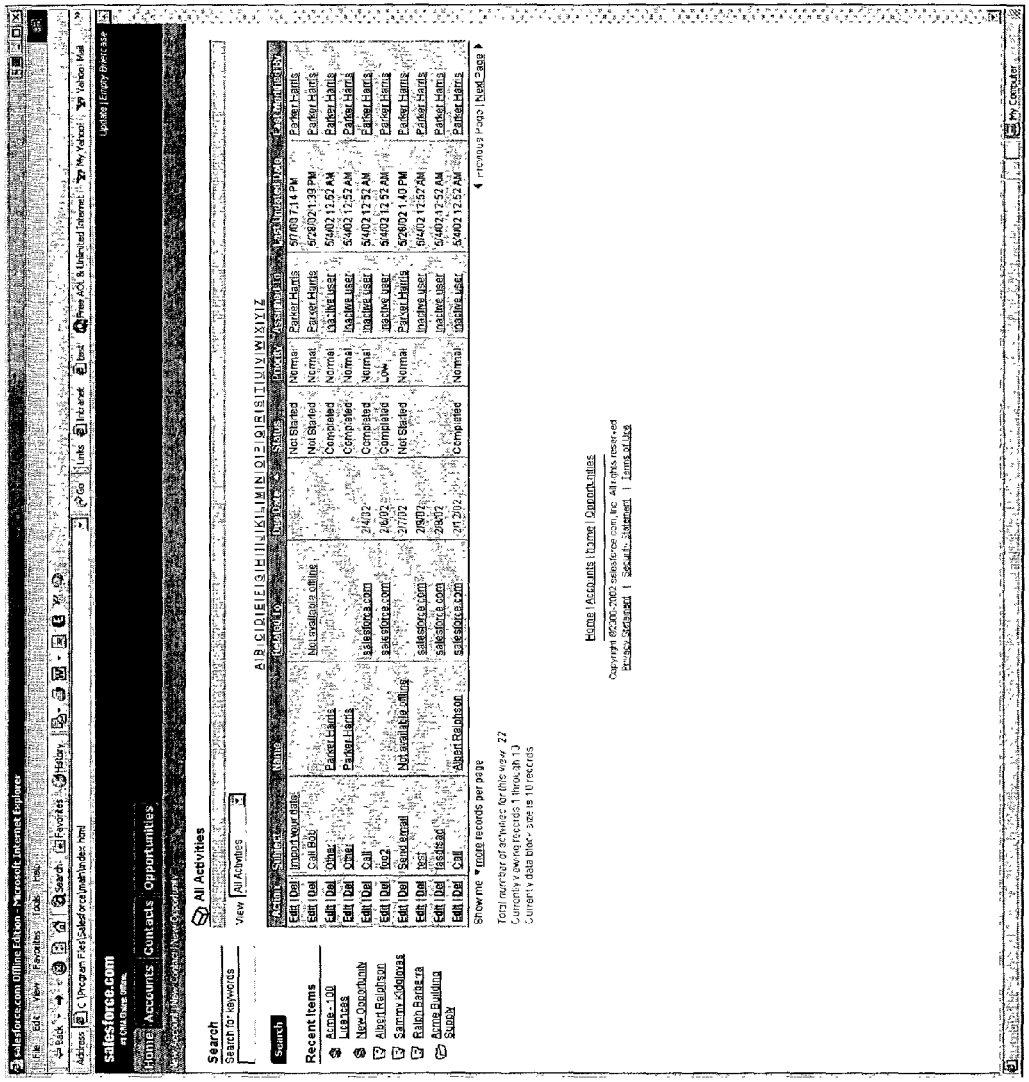
FIG. 9D is a fourth example of the presentation of CRM data during an offline session (Home View).
Figure 9E:
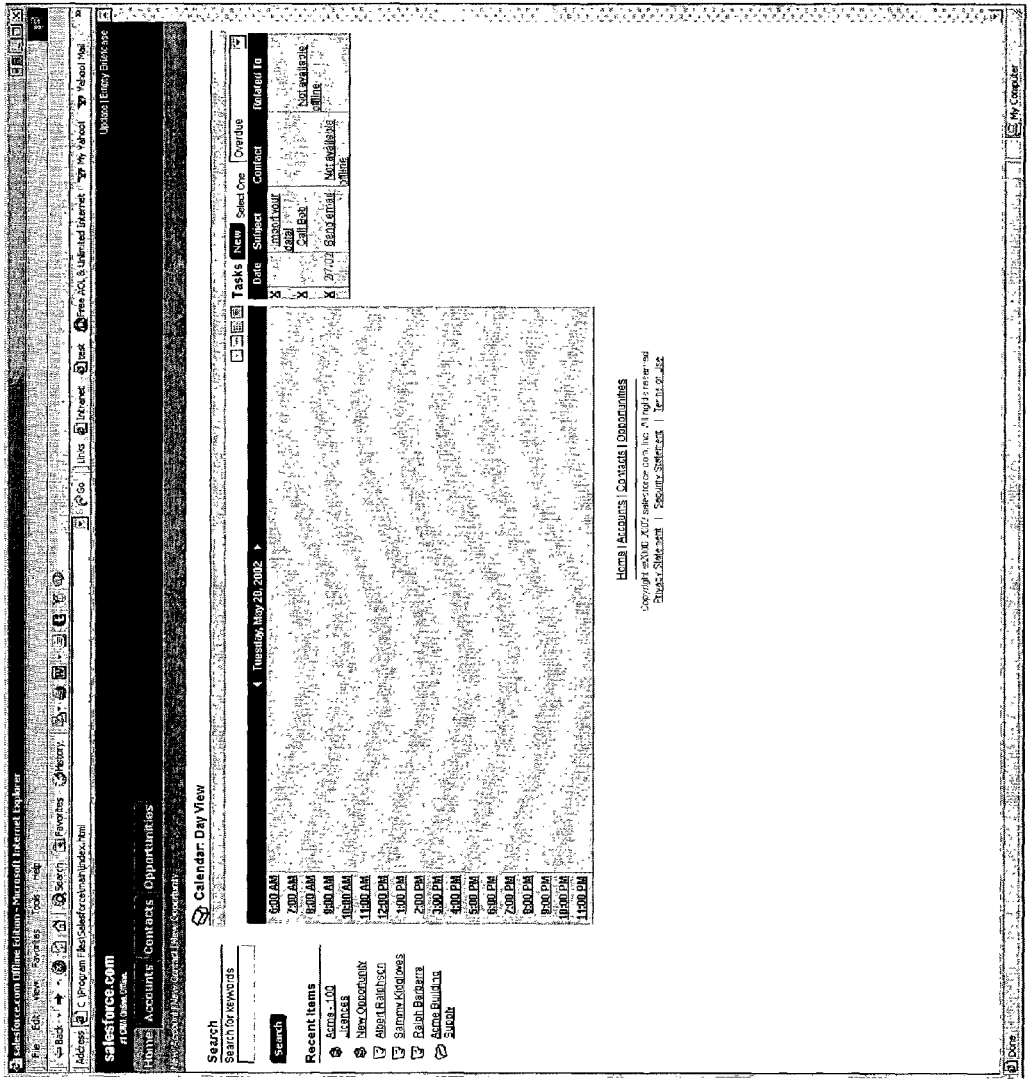
FIG. 9E is a fifth example of the presentation of CRM data during an offline session (Home View).
Figure 10A:
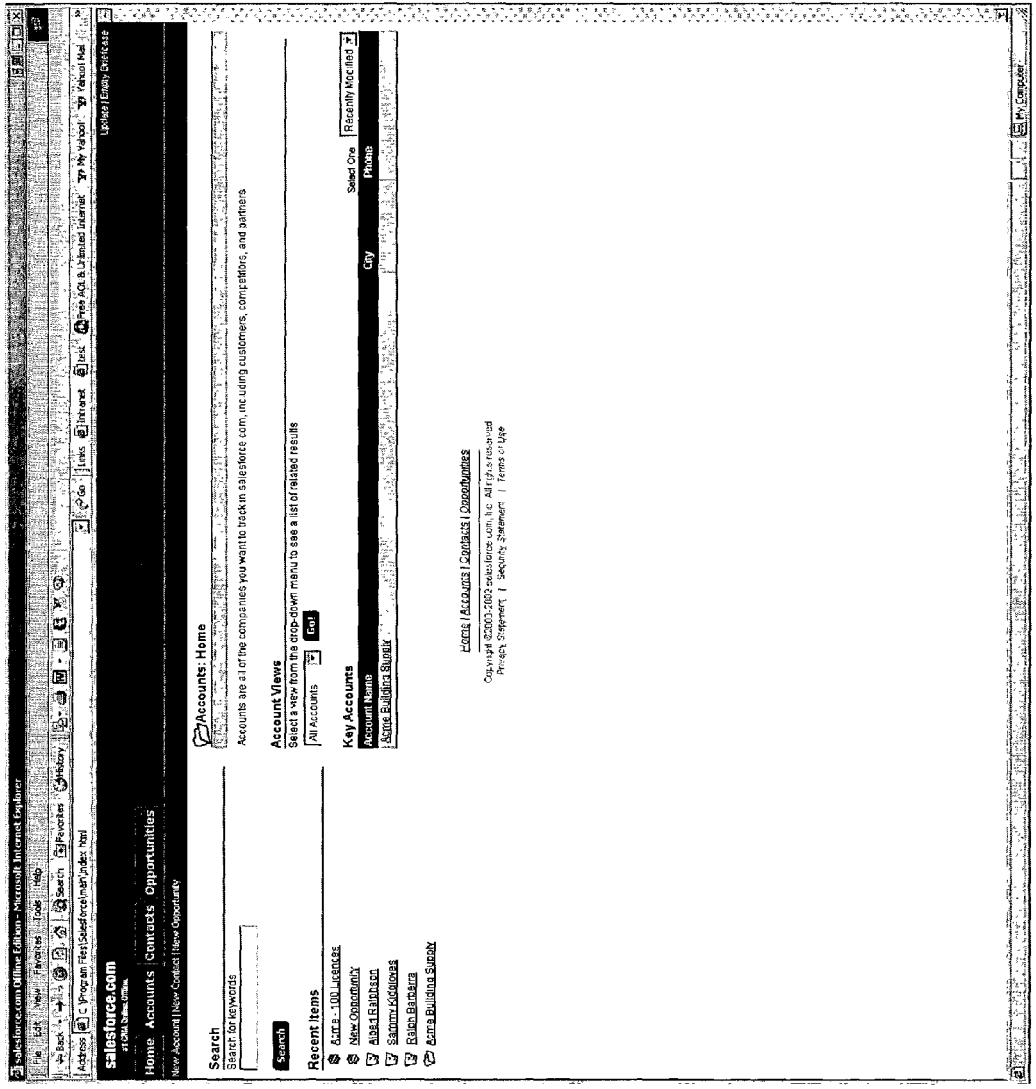
FIG. 10A is an example of the presentation of "Accounts" CRM data during an offline session (Home View).
Figure 10B:
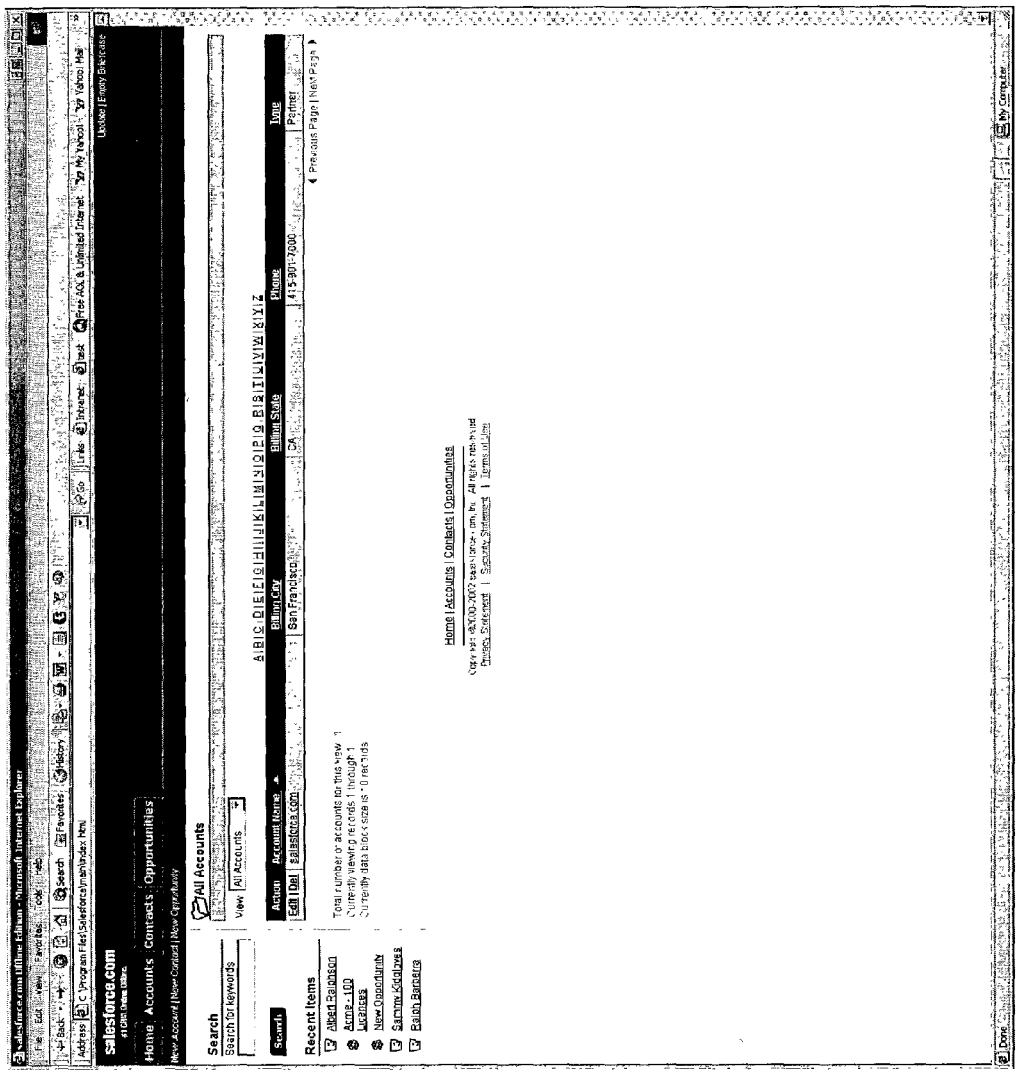
FIG. 10B is an example of the presentation of "Accounts" CRM data during an offline session (All Accounts View).
Figure 10C:
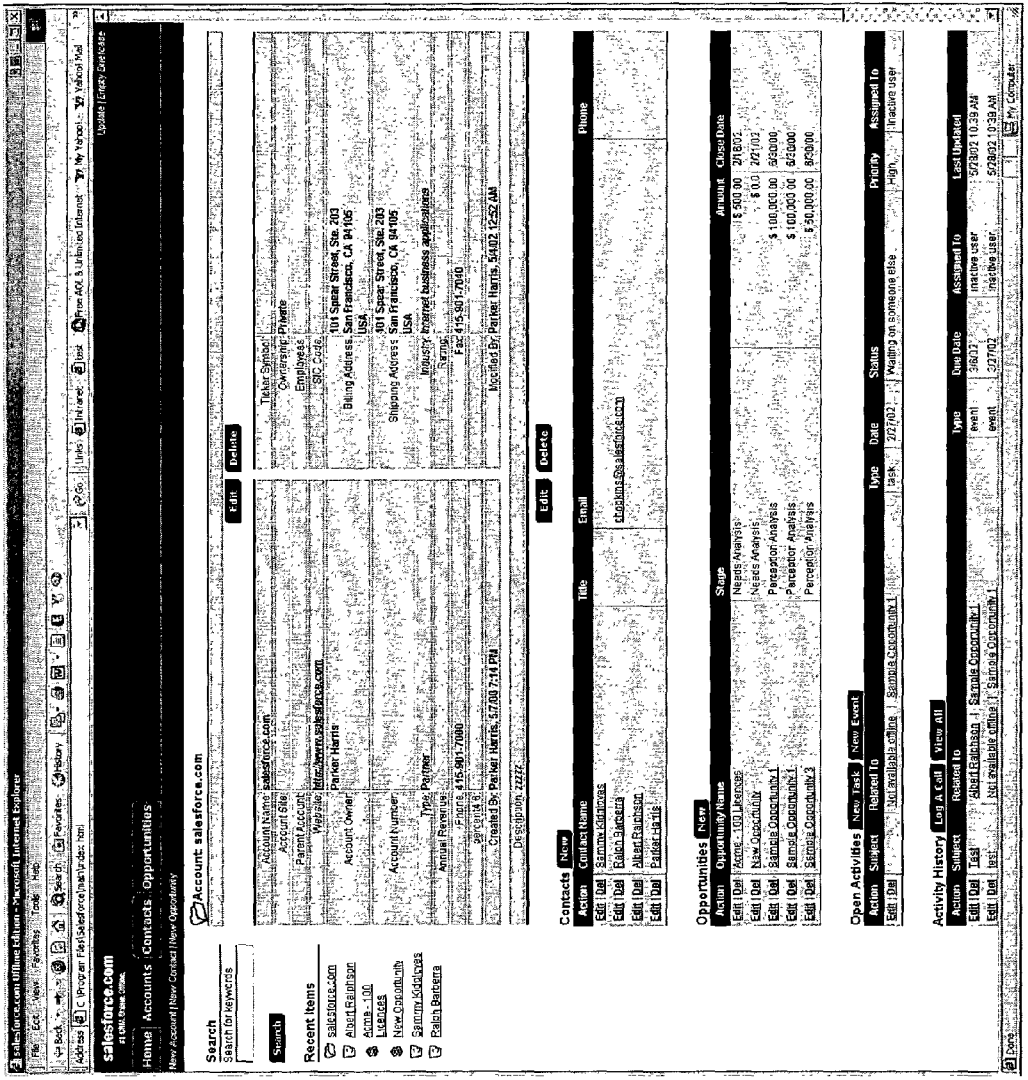
FIG. 10C is an example of the presentation of "Accounts" CRM data during an offline session (Specific Account View).
Figure 10D:
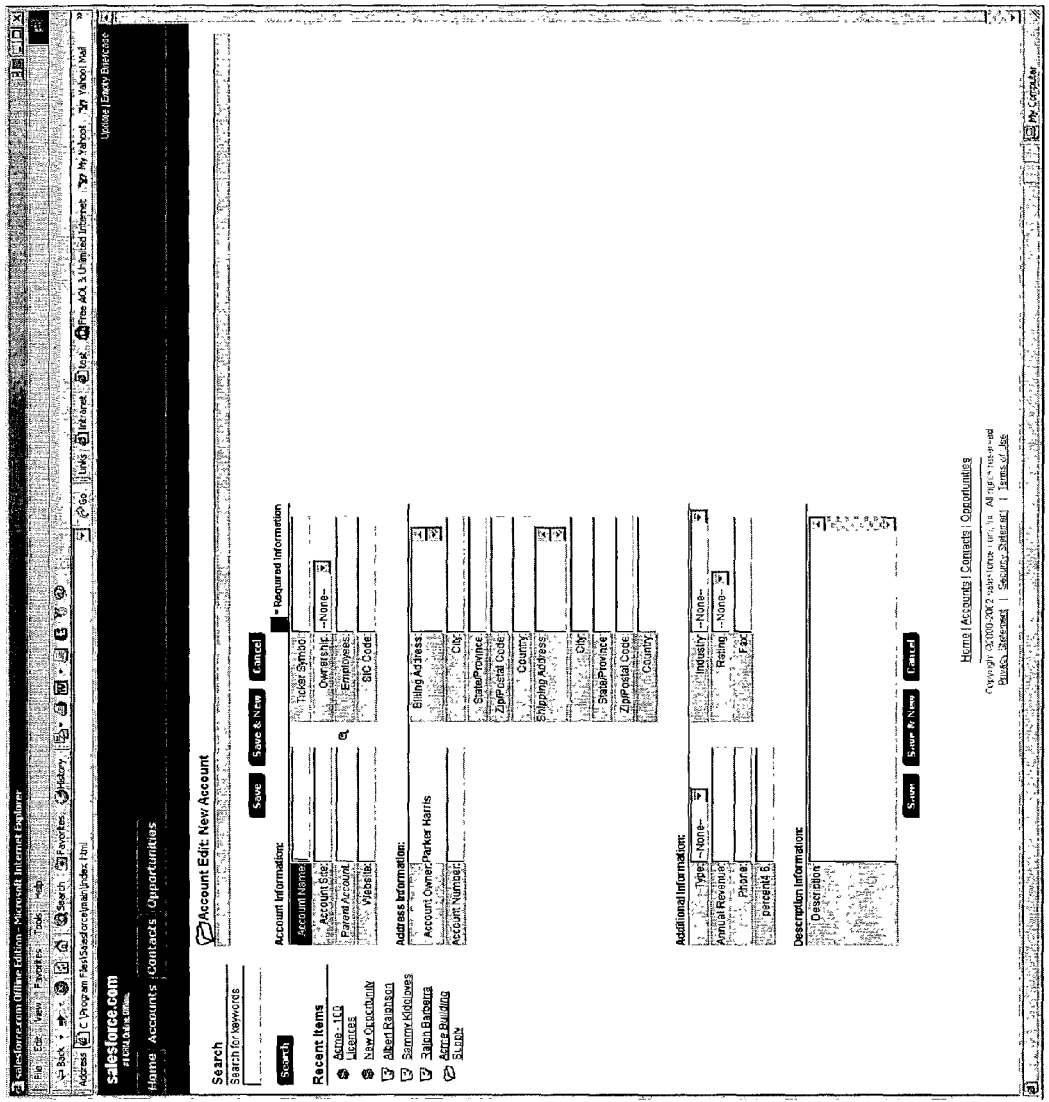
FIG. 10D is an example of the presentation of "Accounts" CRM data during an offline session (New Account View).
Figure 11A:
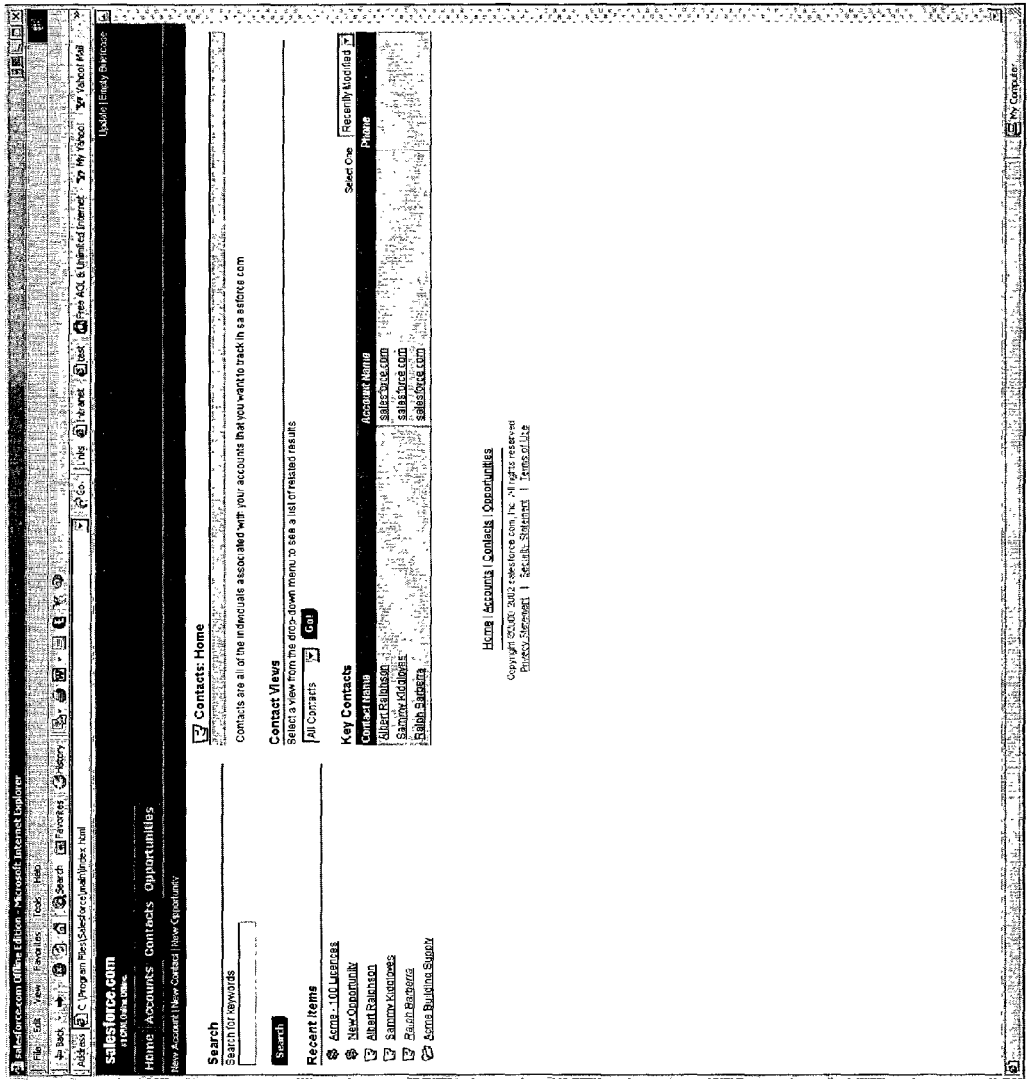
FIG. 11A is an example of the presentation of "Contacts" CRM data during an offline session (Home View).
Figure 11B:
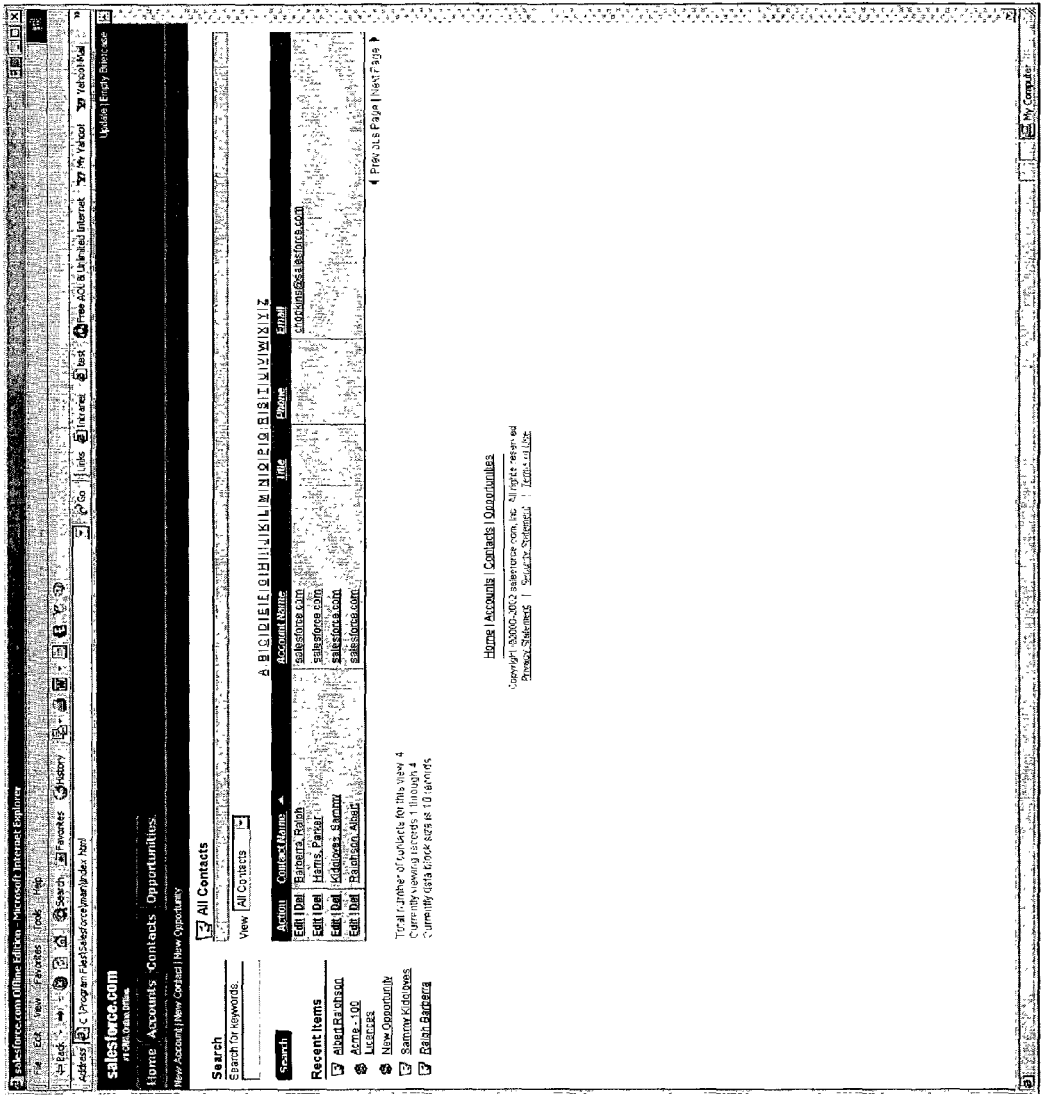
FIG. 11B is an example of the presentation of "Contacts" CRM data during an offline session (All Contacts View).
Figure 11C:
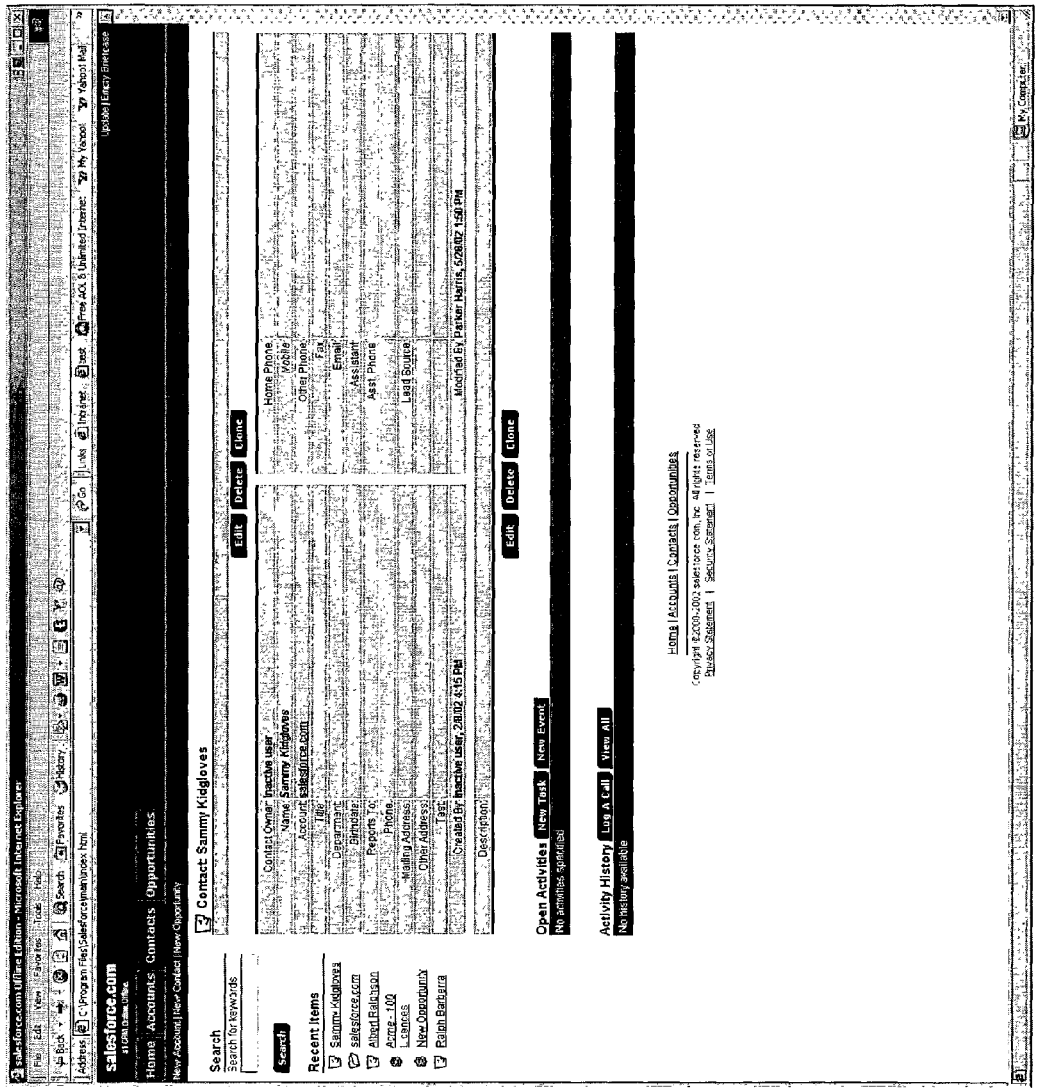
FIG. 11C is an example of the presentation of "Contacts" CRM data during an offline session (Specific Contact View).
Figure 11D:
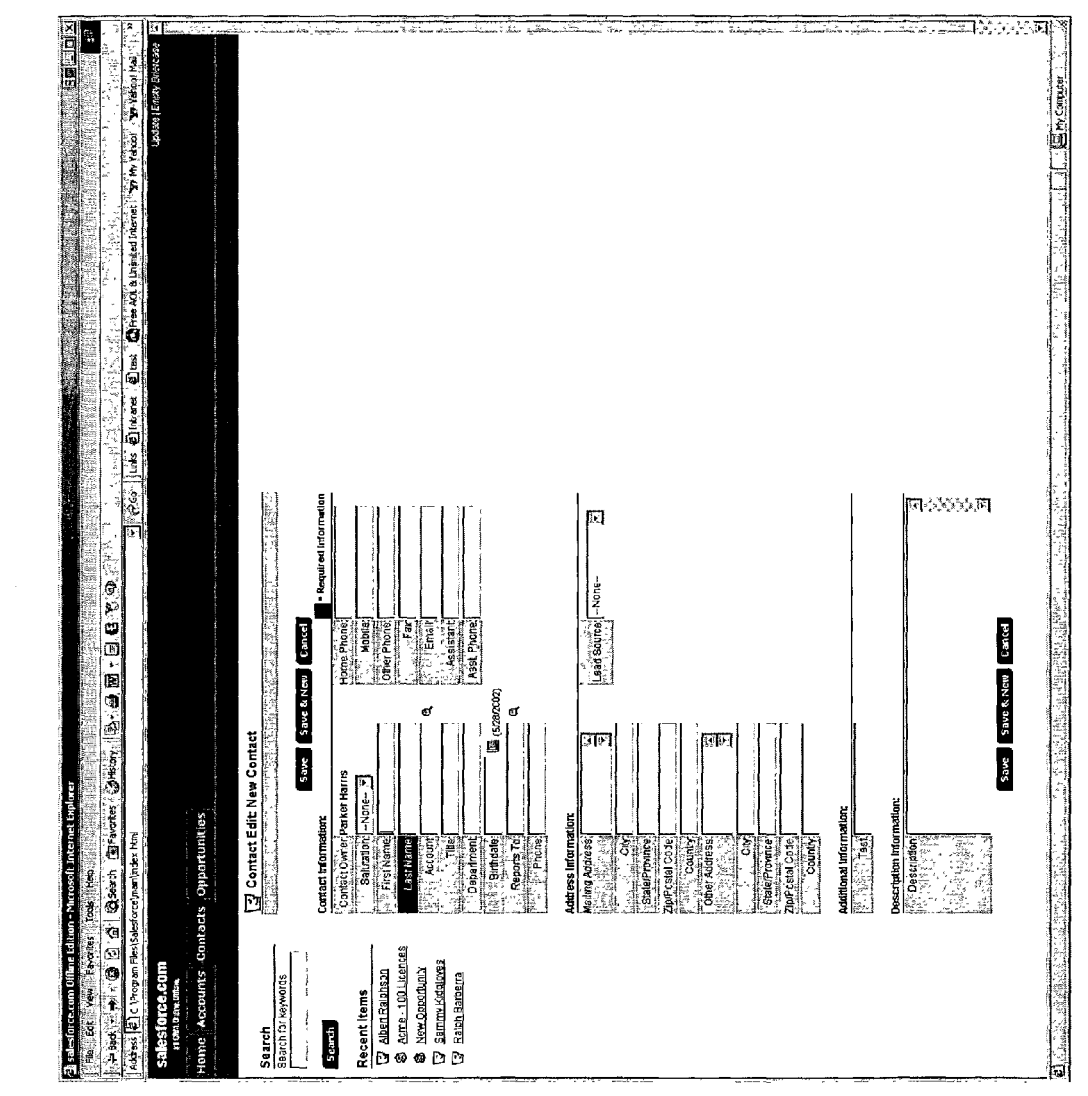
Figure 12A:
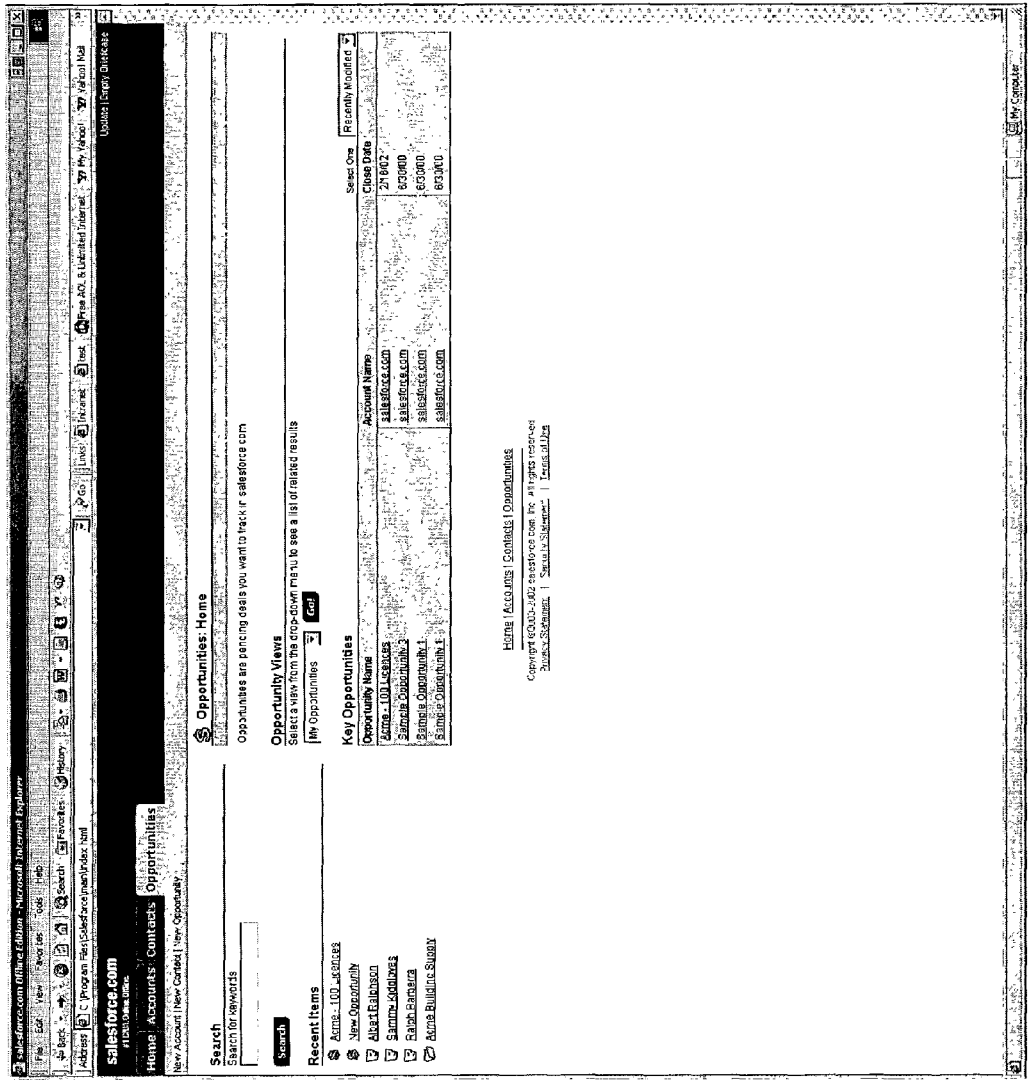
FIG. 12A is an example of the presentation of "Opportunities" CRM data during an offline session (Home View).
Figure 12B:
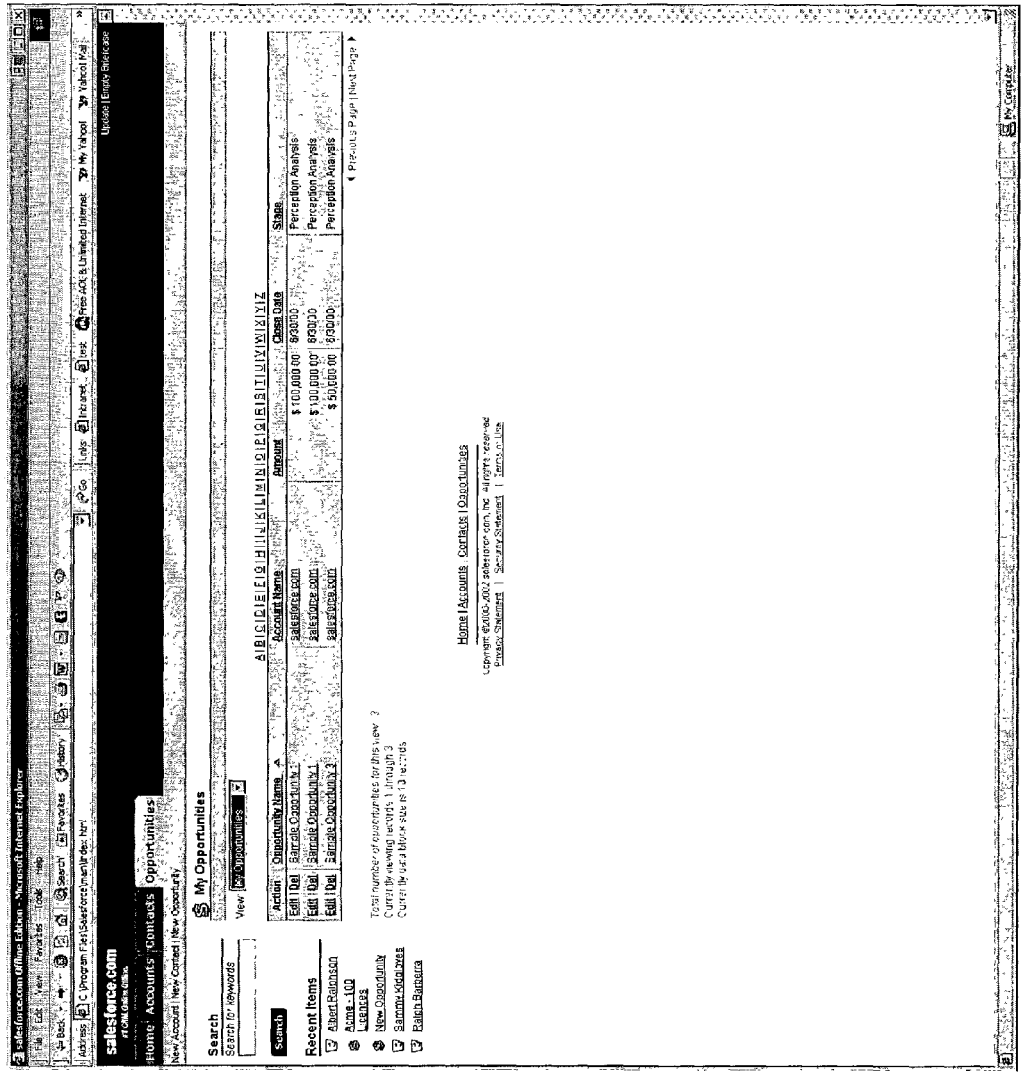
FIG. 12B is an example of the presentation of "Opportunities" CRM data during an offline session (All Opportunities View).
Figure 12C:
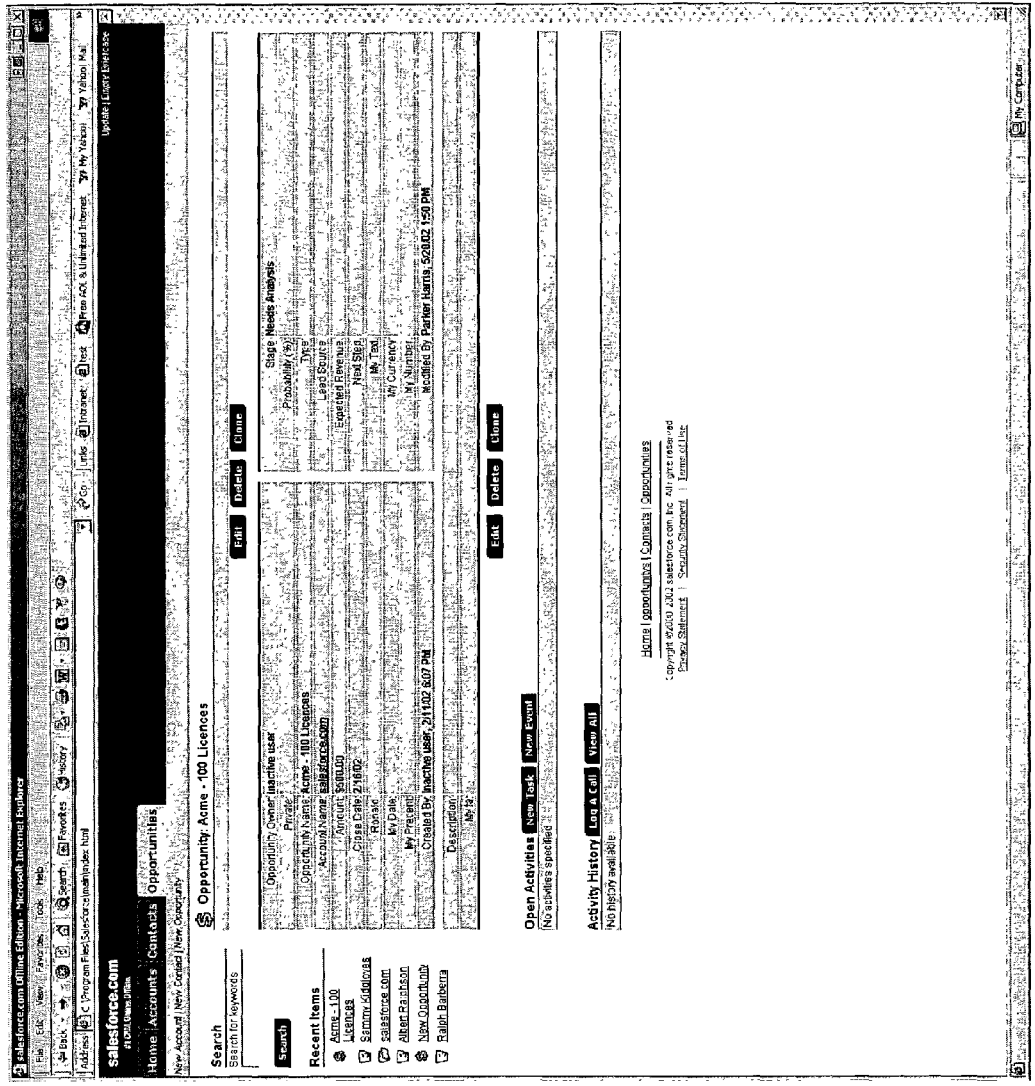
FIG. 12C is an example of the presentation of "Opportunities" CRM data during an offline session (Specific Opportunity View).
Figure 12D:
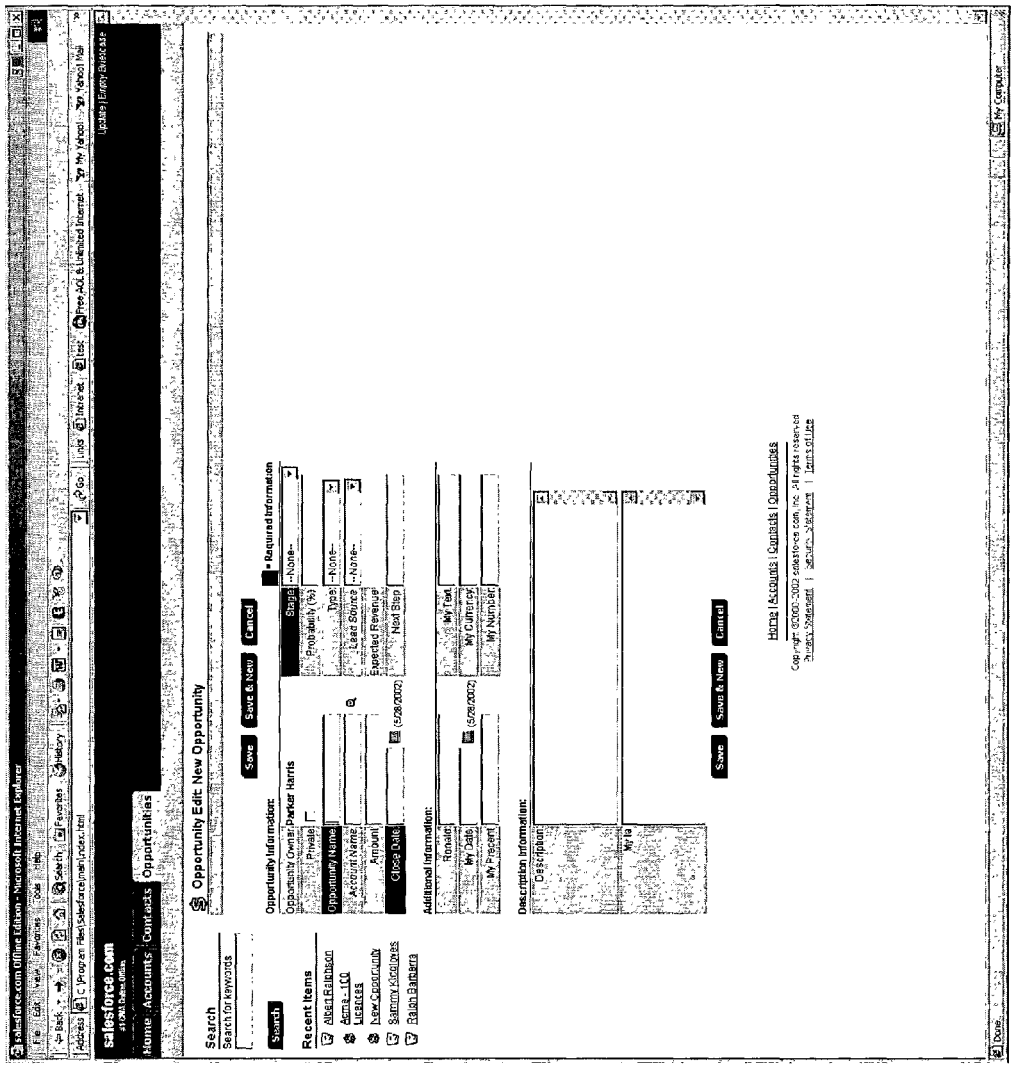
FIG. 12D is an example of the presentation of "Opportunities" CRM data during an offline session (New Opportunity View).

FIGS. 7 to 12D represent examples of the local interface 110 as a web browser that may serve as visual examples for certain steps in the flowchart of FIG. 6. For example, FIG. 7 illustrates a login interface to access the remote server to initiate a synchronization corresponding to 632 of FIG. 6. Similarly, FIG. 8 illustrates the synchronization process of downloading modified and newly created records from the remote database as in 560 of FIG. 6 (and possible uploading of any modified or newly created records to the remote database as in 590 of FIG. 6). Corresponding to Step 642 in FIG. 6, FIG. 9A illustrates one example of an offline home page and FIGS. 9B to 9E illustrate various other alternative "Home" views that may be accessed by the user during an offline session. Similarly, corresponding to Step 644 in FIG. 6, FIGS. 10A to 10C illustrate various views of data organized into an Accounts category. Corresponding to Steps 646 and 648 in FIG. 6, FIGS. 11A to 11D illustrate various views of data organized into a Contacts category and FIGS. 12A to 12D illustrate various view of data organized into an Opportunities category, respectively.

The various embodiments described in the above specification should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. For example and without limitation, those skilled in the art will recognize that there exist alternative proprietary technologies, languages and open standards (e.g., other than JavaScript, XML, XSLT, XML-RPC, HTML, HTTP, etc.) that may be practiced in the context of the Internet and World Wide Web in accordance with the invention set forth herein. Furthermore, while much of the foregoing discussion has been described in the context of the World Wide Web and the Internet (e.g., local interface 110 is a web browser), those skilled in art will recognize that the invention disclosed herein may be implemented in other network environments as well. Similarly, while much of the foregoing discussion utilized the CRM area as an example, those skilled in the art will also recognize that other fields and areas may exploit the invention disclosed herein. Therefore, it is intended that the present invention be defined by the claims that follow.

I claim:

1. A method of conducting and then simulating an online database session, including:
   conducting from at least one client machine through a local interface an online database session via a database server API while the client machine is connected by a network to the online database, including invoking database manipulation logic running on a remote database server responsive to instructions transmitted through the local interface;
   prior to going offline, importing to the client machine at least a data subset and a logic subset,
   wherein the data subset is a subset of data from the online database to be used in an offline database session following the online database session;
   wherein the logic subset is a subset of the database manipulation logic running on the remote database server to be locally simulated on the client machine following the online database session; and
   wherein the logic subset and the data subset are embedded within at least one document and the logic subset is embedded in the document in a format usable by the local interface; and
   conducting a simulated database session using the local interface to access a local version of the database server API in an offline mode, following the online database session, using an imported data subset and a logic subset to simulate and reproduce a user interface to and functionality of the online database session without being connected to the online database.

2. The method of claim 1, further comprising: importing user customizations for presentation of the imported data by the local interface while the client is online.

3. The method of claim 1, wherein the user interface includes a web browser.

4. The method of claim 3 wherein the embedded logic subset is expressed in a scripting language understood by the web browser.

5. The method of claim 1, wherein the format comprises at least one document that utilizes a markup language to identify structures within the document.

6. The method of claim 1, wherein the imported data subset is stored in at least one document that utilizes a markup language to identify structures within the document.

7. The method of claim 1, wherein the imported data subset and embedded logic subset relate to customer relationship management.

8. The method of claim 1, wherein the logic subset is embedded into an HTML document.

9. The method of claim 1, wherein the logic subset is accessed using a URL embedded into an HTML document.

10. The method of claim 1, wherein simulating, only so long as the client is offline, an online session with the database by invoking the logic subset, includes: invoking the embedded logic subset to build at least one dynamically generated screen to enable a user to manipulate the data imported.

11. The method of claim 1, wherein the logic subset embedded into a document in a format capable of being used by the local interface includes: database server logic for creating one or more new records to hold data when the client is offline.

12. The method of claim 1, wherein the data subset is corresponds to a user criteria for conducting an offline session.

13. The method of claim 1, wherein the database comprises a relational database.

14. A system that enables a client system to conduct and to simulate an online database session, including:
   an online database server, sometimes simulated, that includes online database manipulation logic running on the database server accessed via a database server API that manipulates an online database responsive to instructions received from a local interface of a client machine;
   a data packaging service, coupled to the database server, that packages a data subset of data stored by the online database to be used in an offline database session;
   a logic packaging service, coupled to the database server, that packages a logic subset of the database manipulation logic running on the database server to be locally simulated on the client machine following the online database session; and
   an export service, operable during an online session, that exports for use by the client machine at least a data subset a the logic subset, wherein the export service embeds the logic subset and the data subset within at least one document in a format usable by the local interface of the client machine; and
   wherein the document containing the data subset and the logic subset includes instructions usable by the local interface on the client machine via a local version of the database server API to conduct a simulated database session in an offline mode and reproduce a user interface to and functionality of the online database session without being connected to the online database.

15. The system of claim 14, an import service that imports data from the client that had been manipulated during the simulated database session conducted by the client while the client was not connected to the online database.

16. The system of claim 14, wherein the export service is further capable of exporting user customizations for the presentation of the exported data by the user interface.

17. The system of claim 14, wherein the export service is implemented with XML-RPC.

18. The system of claim 14, wherein the user interface includes a web browser.

19. The system of claim 18 wherein the embedded logic subset is expressed as a scripting language understood by the web browser.

20. The system of claim 14, wherein the documents utilize a markup language to identify structures within the documents.

21. The system of claim 14, wherein the exported data subset is exported as at least one document that utilizes a markup language to identify structures within the document.

22. The system of claim 14, wherein the exported data subset and embedded logic subset relate to customer relationship management.

23. A non-transitory computer readable media including computer instructions that, when run on a client machine, implements on at least one client machine:

conducting from at least one client machine through a local interface an online database session via a database server API while the client machine is connected by a network to the online database, including invoking database manipulation logic running on a remote database server responsive to instructions transmitted through the local interface;

prior to going offline, importing to the client machine at least a data subset and a logic subset, wherein a data subset of data from the online database to be used in an offline database session following the online database session;

wherein the logic subset of the database manipulation logic running on the database server to be locally simulated on the client machine following the online database session; and wherein the logic subset and the data subset are embedded within at least one document and the logic subset is embedded in the document in a format usable by the local interface; and conducting a simulated database session using the local interface to access a local version of the database server API in an offline mode, following the online database session, using the imported data subset and logic subset to simulate and reproduce a user interface to and functionality of the online database session without being connected to the online database.

24. The computer instructions of claim 23 wherein the user interface includes a web browser.

25. The computer instructions of claim 23, wherein at least a portion of the computer instructions are expressed in a scripting language.

26. The computer instructions of claim 23, wherein the format comprises at least one document that utilizes a markup language to identify structures within the document.

27. The computer instructions of claim 23, wherein the imported data subset is stored in at least one document that utilizes a markup language to identify structures within the document.

28. The computer instructions of claim 23, wherein the computer instructions and the imported data subset relate to customer relationship management.

* * * * *